US009825461B2

(12) United States Patent
Hodrinsky et al.

(10) Patent No.: US 9,825,461 B2
(45) Date of Patent: Nov. 21, 2017

(54) MODULAR DIRECT CURRENT POWER DISTRIBUTION NETWORK, AND A METHOD FOR ITS USE

(71) Applicant: Liteideas, LLC, Mansfield Center, CT (US)

(72) Inventors: Todd W Hodrinsky, Mansfield Center, CT (US); Roger Whyte, Charlottesville, VA (US); Phil Ameen, Jupiter, FL (US); Li Peifang, Zhejiang (CN)

(*) Notice: Subject to any disclaimer, the term of this patent is extended or adjusted under 35 U.S.C. 154(b) by 345 days.

(21) Appl. No.: 14/625,072

(22) Filed: Feb. 18, 2015

(65) Prior Publication Data
US 2016/0241029 A1  Aug. 18, 2016

(51) Int. Cl.
| H02J 1/14 | (2006.01) |
| H02J 7/00 | (2006.01) |
| H02J 7/34 | (2006.01) |
| H02J 13/00 | (2006.01) |
| H02J 7/35 | (2006.01) |

(52) U.S. Cl.
CPC .............. *H02J 1/14* (2013.01); *H02J 7/0042* (2013.01); *H02J 7/0054* (2013.01); *H02J 7/0072* (2013.01); *H02J 7/34* (2013.01); *H02J 13/0003* (2013.01); *H02J 7/35* (2013.01); *Y02E 40/72* (2013.01); *Y04S 10/123* (2013.01)

(58) Field of Classification Search
CPC .......... H02J 1/14; H02J 7/0012; H02J 7/0054; H02J 7/0072; H02J 7/34; H02J 13/0003; H02J 7/35
USPC ....................... 307/18, 19, 20, 21, 22, 23, 24
See application file for complete search history.

(56) References Cited

U.S. PATENT DOCUMENTS

| 5,365,145 A | 11/1994 | Fields |
| 8,096,673 B2 | 1/2012 | Kuo |
| 8,536,791 B2 | 9/2013 | Hsieh et al. |
| 8,564,220 B2 | 10/2013 | Matthews et al. |
| 2009/0167245 A1* | 7/2009 | Nguyen ............... H02J 7/0052 320/128 |
| 2012/0219084 A1* | 8/2012 | Ihm ..................... H04B 7/0617 375/267 |
| 2014/0077595 A1* | 3/2014 | Kakuya .............. H01M 10/441 307/24 |

(Continued)

FOREIGN PATENT DOCUMENTS

WO  WO2012165197  * 6/2012  ............... H02J 1/10

Primary Examiner — John Poos
(74) Attorney, Agent, or Firm — Law Office of Ilya Libenzon

(57) ABSTRACT

A modular direct current power distribution network includes a first power distribution block including a first housing, a first main power storage device enclosed within the housing, a first plurality of device connection ports in the housing, and at least one first transistor controlling the connection from the first main power storage device to the first plurality of device connection ports, at least one external device, the at least one external device having a power exchange port electrically connected to a device connection port of the first plurality of device connection ports and an individual power storage device electrically connected to the power exchange port, and a first controller configured to sense a load sharing threshold event matching a load sharing threshold, and to modify the state of the at least one first transistor in response to the load sharing threshold condition.

20 Claims, 17 Drawing Sheets

(56) References Cited

U.S. PATENT DOCUMENTS

2014/0293592 A1 10/2014 Hopper
2015/0108833 A1* 4/2015 Ito .......................... H02J 3/383
          307/23

* cited by examiner

MODULAR DIRECT CURRENT POWER DISTRIBUTION NETWORK, AND A METHOD FOR ITS USE

TECHNICAL FIELD

The device and methods disclosed herein relate generally to power distribution, and particularly to direct current power distribution and storage.

BACKGROUND ART

As society advances technologically, dependence on reliable electrical power increases. Internet access, lighting, refrigeration, and many other modern amenities depend upon electricity to function. Unfortunately, electrical power is not always available to all people. In developing nations, a sizeable number of people live with undependable electrical grids, where blackouts are frequent and unpredictable. Some live where there is no electrical grid at all; the financial and technical difficulties attendant to providing traditional electrical power to such people has made their journey to the computer age frustratingly slow. People without reliable electricity are at a huge and growing disadvantage in the modern global economy. Even in developing nations with well-maintained grids, power outages are a regular occurrence, and can result in substantial inconvenience to affected people. The kerosene, diesel, and gasoline-power generators that some people typically use to deal with such issues are expensive, noisy, and noxious, and require constant fuel and maintenance to function adequately.

Renewable energy sources such as solar panels and wind turbines have become increasingly effective and affordable, and offer a useful alternative source of electrical power, as well as the ability to improve personal environmental impact. However, integrating renewable energy sources into the local power grid creates engineering, financial, and bureaucratic issues, thwarting the desires of people who, for reasons of frugality or environmental concern, wish to exploit renewable energy to a greater extent.

Therefore, there remains a need for affordable, reliable, and flexible solutions to local electrical power needs.

SUMMARY OF THE EMBODIMENTS

In one aspect, a modular direct current power distribution network includes a first power distribution block including a first housing, a first main power storage device enclosed within the housing, a first plurality of device connection ports in the housing, and at least one first transistor controlling the connection from the first main power storage device to the first plurality of device connection ports. The network includes at least one external device, the at least one external device having a power exchange port electrically connected to a device connection port of the first plurality of device connection ports and an individual power storage device electrically connected to the power exchange port. The network includes a first controller configured to sense a load sharing threshold event matching a load sharing threshold, and to modify the state of the at least one first transistor in response to the load sharing threshold condition.

In a related embodiment, the first main power storage device further includes at least one battery. In another embodiment, the at least one external device further includes a load that consumes electrical power. In an additional embodiment, the at least one external device further includes a second transistor electrically connecting the power exchange port to the individual power storage device and a second control circuit configured to sense a second load sharing threshold and to change the state of the second transistor in response to the second load sharing threshold. In another related embodiment, the load sharing threshold represents a ratio of the power stored in the first main power storage device to the power stored in the individual power storage device of the at least one first external device.

In still another embodiment, the first power distribution block further includes a manual switch having a first state and a second state, and wherein the first controller is configured to associate the first state with a first category of devices connected to the first plurality of device connection ports and to associate the second state with a second category of devices connected to the first plurality of device connection ports. In yet another embodiment, the first controller is further configured to use a first load sharing threshold when the manual switch is in the first state, and to use a second load sharing threshold when the manual switch is in the second state. In a further embodiment, the first controller is further configured to apply a first external device charging characteristic when the manual switch is in the first state, and to apply a second charging characteristic when the manual switch is in the second state. In another embodiment, the first controller is further configured to sense a power surge in excess of a one surge threshold, and to change the state of the at least one first transistor in response to the power surge. A related embodiment includes a manual switch having at least a first state and a second state, wherein the first controller is further configured to use a first surge threshold when the manual switch is in the first state and to use a second surge threshold when the manual switch is in the second state.

In an additional embodiment, the network includes an additional external power storage device electrically connected to the at least one device connection port. In a related embodiment, the load sharing threshold represents a ratio between power stored in the at least one additional external power storage device and at least one of the at least one first external device and the main power storage device. In an additional embodiment, the power distribution block further includes at least one first input port electrically connected to the first main power storage device, and the network further includes at least one external power source electrically connected to the at least one first input port. In a related embodiment, the at least one external power source further includes a photovoltaic power source electrically connected to the at least one first input port. In another related embodiment, the at least one external power source further includes an alternating current power source electrically connected to the at least one first input port using an adapter that converts alternating current to direct current. A further embodiment still also includes a second transistor connecting the at least one first input port to the first main power storage device, and in that embodiment the first controller is configured to detect a surge threshold condition and to change the state of the second transistor in response to the detected surge threshold event.

Another embodiment also includes a second power distribution block having a second housing, and a second plurality of device connection ports in the second housing, and in that embodiment at least one of the second plurality of device connection ports is connected to at least one of the first plurality of device connection ports. In another embodiment, the second power distribution block further includes a second main power storage device enclosed within the second housing and connected to the second plurality of device connection ports, at least one second transistor controlling the connection between the second main power storage device and the second plurality of connection ports, and at least one second controller configured to sense a second load sharing threshold condition and to modify the state of the at least one second transistor in response to the second load sharing threshold condition. In yet another related embodiment, the second power distribution block further includes at least one second transistor controlling the connection between at least two device connection ports of the second plurality of connection ports and at least one second controller configured to sense a second load sharing threshold condition and to modify the state of the at least one second transistor in response to the second load sharing threshold condition. Another embodiment of the network includes at least one surge protector between the first main power storage device and the at least one external device.

In another aspect a method for load balancing in a modular direct circuit network includes providing a modular direct current power distribution network as described above. The method includes detecting, by the first controller, a load sharing threshold event matching a load sharing threshold. The method includes modifying, by the first controller, the state of the at least one first transistor in response to the detected load sharing threshold event.

Other aspects, embodiments and features of the disclosed device and method will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation at its initial drawing depiction. For purposes of clarity, not every component is labeled in every figure. Nor is every component of each embodiment of the device and method is shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood that the invention is not limited to the precise arrangements and instrumentalities shown.

DETAILED DESCRIPTION OF SPECIFIC EMBODIMENTS

Embodiments of the disclosed direct current power distribution network allow users to store power in one or more units that may be connected together and function in concert as a single power storage unit. Users can charge the network using various power sources, including solar panels, wall plugs, and lead-acid batteries. Off-grid users anywhere in the world can use this system as a safe and affordable way to provide themselves with electrical power. Users on the grid can use this system as an efficient and flexible emergency power system, or as a way to increase the energy efficiency of their lifestyles by incorporating inexpensive renewable energy sources.

Figure 1A:
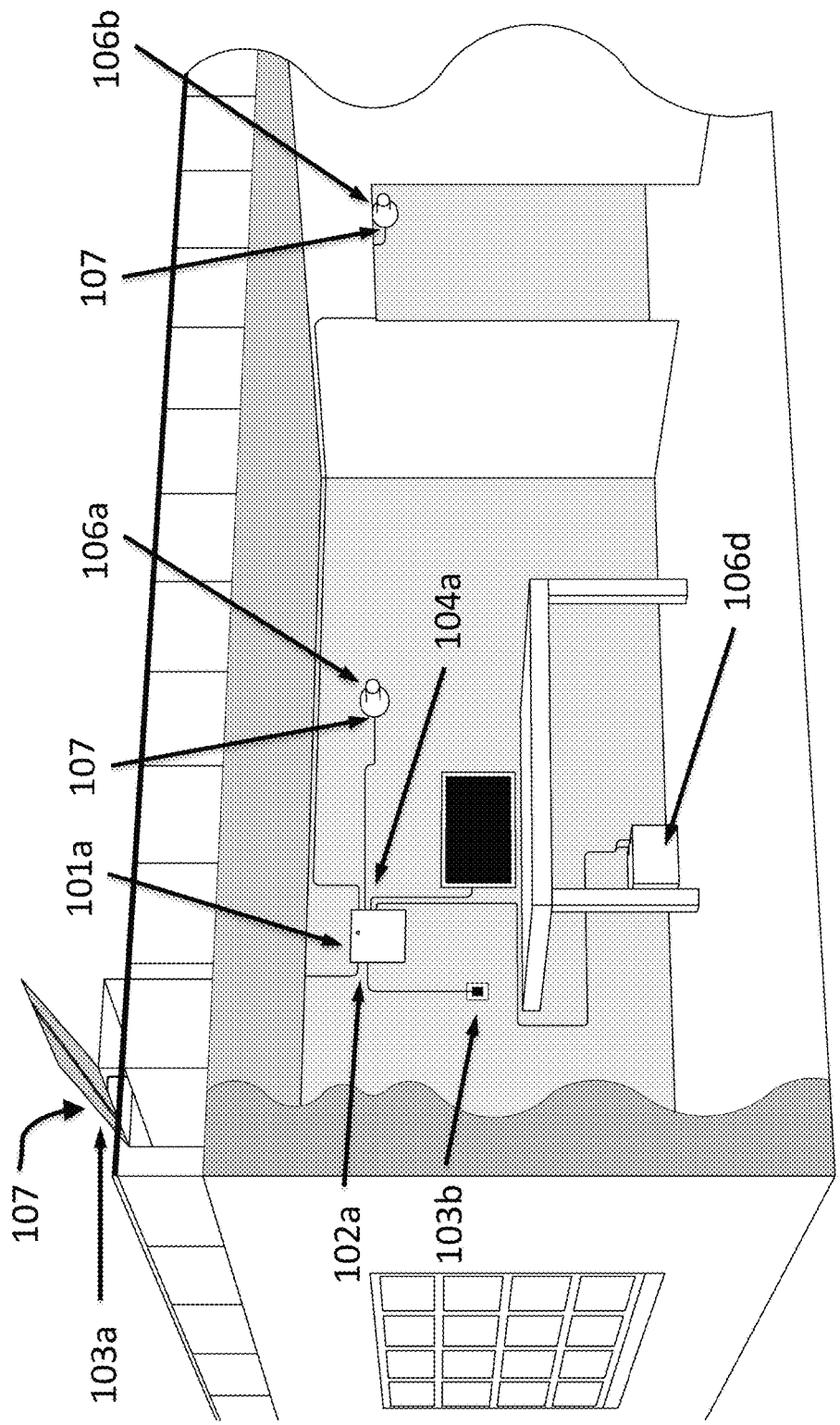
FIG. 1A is a schematic diagram illustrating one embodiment of the power distribution network, as deployed in a dwelling.
Figure 1B:
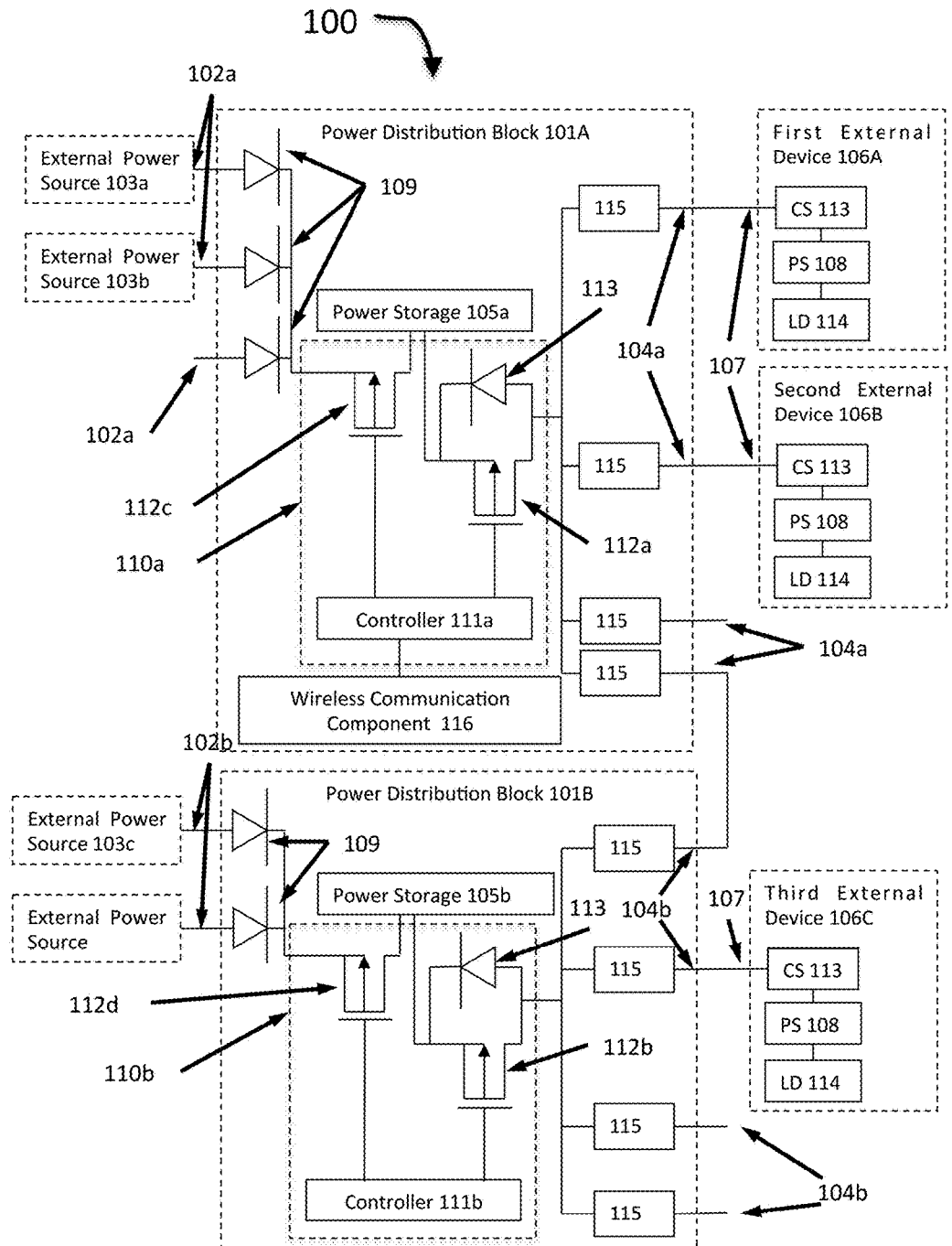
FIG. 1B is a circuit diagram illustrating one embodiment of the network.

FIG. 1A is a schematic diagram illustrating an embodiment of the disclosed modular direct current power distribution network 100 as deployed in a house. FIG. 1B is a circuit diagram of an embodiment of the disclosed power distribution network 100. As a brief overview, the power distribution network 100 includes at least one power distribution block 101a. In some embodiments, the power distribution block 101a may have at least one input port 102a adapted to receive direct current electrical power from an external power source 103a-b. In some embodiments, the power distribution block 101 has at least one device connection port 104a. The power distribution block 101 may have at least one main power storage device 105a. The power distribution network 100 includes at least one external device 106*a*-*b* having a power exchange port 107 electrically connected to a device connection port 104*a* of the power distribution block 101*a*. The at least one external device 106*a*-*b* may have an individual power storage device 108.

The network 100 includes a power distribution block 101. FIGS. 2A-2D illustrate embodiments of the power distribution block 101. In some embodiments, the power distribution block 101 includes a housing 200. The housing 200 may include an exterior surface 201. The exterior surface may have a top surface 202. The top surface 202 may be substantially polygonal; for instance, the top surface 202 may be substantially square. The top surface 202 may be a substantially regular polygon. The top surface 202 may be substantially an irregular polygon; for instance, the top surface 202 may be rectangular. The top surface 202 may be trapezoidal. The top surface 202 may be substantially a combination of polygons. As an example, top surface 202 may be describable in as a combination of variously sized and formed triangles. The top surface 202 may be curved. The top surface 202 may be elliptical. The top surface 202 may be circular. The top surface 202 may be a more complex curved form, such as a bent or irregular ellipse. The top surface 202 may be any combination of curved and polygonal forms; for instance, the top surface 202 may be rectangular with rounded corners. The top surface 202 may be a parabola truncated by at least one straight line. The top surface 202 may have indentations in its perimeter. The top surface 202 may have protrusions from its perimeter. The housing 200 may include a bottom surface 203 and a lateral surface 204 connecting the top surface 202 to the bottom surface 203. The bottom surface 203 may have any shape suitable for the top surface 202. The top surface 202 may be the same shape as the bottom surface 203; for instance, the housing 200 may have the form of a substantially rectangular prism. The housing 200 may have the form of a substantial cylinder or disk. The lateral surface 204 may have a cross-section describing any shape suitable for the top 202 or bottom 203. In some embodiments, the cross-section of the lateral surface 204 may match the shapes of the top 202 and bottom 203. For instance, where the top 202 and bottom 203 form substantially congruent rectangles, the lateral surface 204 may connect the top 202 and bottom 203 to complete a rectangular prism; the lateral surface 204 may have a front face containing the at least one device connection port 104, a rear face containing the at least one input port 102, and two side faces. Likewise, where the top 202 and bottom 203 are formed of substantially congruent circles, the lateral surface 204 may form a cylinder wall between the top 203 and bottom 204. The housing 202 may be composed of a plurality of forms combined together; for instance, the bottom 203 may be wider or narrower than the top 202, and the bottom 203 and top 202 may have differing shapes as well, with the lateral surface 204 forming various possible forms connecting the top 202 and bottom 203 surfaces.

The housing 200 may be constructed of any material or combination of materials that are substantially rigid. The housing 200 may be composed at least in part of a polymer; the polymer may be a plastic. The polymer may be a resin. The housing 200 may be composed at least in part of a metal, such as steel, aluminum or titanium. The housing 200 may be composed at least in part of wood. The housing 200 may be composed at least in part of a composite material such as fiberglass. The housing 200 may be composed at least in part of glass. The housing 200 may be composed at least in part of ceramic. The housing 200 may be composed of a combination of materials; for instance, the housing 200 may be composed of multiple layers of materials. The housing 200 may be composed of one principal material coated with another material; for instance, the housing 200 might be metal with a paint or polymer coating on its exterior 201.

The power distribution block 101*a* may include a wall-mounting bracket 205. In some embodiments, the power distribution block 101*a* is detachable from the wall-mounting bracket 205. The power distribution block 101*a* may be attached to the wall bracket via a fastener-free attachment; for instance, the power distribution block 101*a* may include keyhole slots in the bottom 203, and the wall-mounting bracket 205 may include knobs with shapes analogous to round-headed or double-headed screws, having heads designed to pass closely through the circular portion of the keyhole slots, and relatively slender necks that can slide into the narrow portion of the keyhole slots, such that placing the power distribution block 101*a* on the wall-mounting bracket 205 so that the round portions of the keyhole slots pass over the heads of the knobs, and then sliding the power distribution block 101*a* against the wall-mounting bracket 205 so that the necks of the knobs pass into the narrow portions of the keyhole slots, secures the housing 200 to the wall-mounting bracket 205. In other embodiments, the wall-mounting bracket 205 and the power distribution block 101*a* are reciprocally threaded, so that they can be fixed to one another by rotating one against the other. Persons skilled in the art will be aware of many other suitable options for fastener-free attachment. In other embodiments, the power distribution block 101*a* attaches to the wall-mounting bracket 205 by means of fasteners; for instance, the wall-mounting bracket 205 may have bolts that protrude through holes in a portion of the power distribution block 101*a*, to be fastened using nuts, such as wing-nuts.

The power distribution block 101*a* includes at least one input port 102. The at least one input port 102 may be a port in the exterior surface 201 of the housing 200. The at least one input port 102 may be any port suitable for connecting a direct current power source to a direct current circuit. For instance, the input port 102 may be formed to accept a coaxial connector. The input port 102 may be formed to accept a cylindrical connector. The input port 102 may be formed to accept a snap and lock DC connector, such as a 3-pin or 4-pin connector. The input port 102 may be formed to accept a connector consistent with standards promulgated by the International Electrotechnical Commmision (IEC), such as IEC 60906-3:1994. The input port 102 may be formed to accept a Tamiya connector. The input port 102 may be formed to accept a Deans connector. The input port 102 may be formed to accept a JST RCY connector. The input port 102 may be formed to accept an inverter tab or lug. The input port 102 may allow the transfer of electric energy by electromagnetic induction; for instance, the input port 102 may transfer energy from the at least one power source 103*a* to the power distribution block 101*a* by means of a coil in electric contact with the source 103*a* that produces a varying magnetic field which in turn induces an electric current in a second coil incorporated in the circuitry of the power distribution block 101*a*.

In some embodiments, as illustrated in FIGS. 1A-1B, the input port 102*a* is adapted to receive direct current electrical power from at least one external power source 103*a*-*b*. In some embodiments, the at least one external power source is a photovoltaic power source 103*a* that converts electromagnetic radiation into electricity using the photovoltaic effect; the photovoltaic power source 103*a* may use one or more photodiodes to convert electromagnetic radiation into electricity. For instance, the external power source 103*a* may include a solar panel. In some embodiments, the photovoltaic power source 103*a* is a 50-watt solar panel; as an example, the solar panel may have open circuit voltage of 21.4 V, short circuit current of 3.32 A, maximum-power voltage of 17.5 V, maximum-power current of 2.86 A, and maximum system voltage of 600V. As a further example, the solar panel may have a length of 550 millimeters (21.7 inches), a width of 705 millimeters (27.8 inches), and a thickness of 25 millimeters (1 inch); the solar panel may have an approximate weight of 5 kilograms (11 pounds). The photovoltaic power source 103*a* may be include a plurality of solar panels electrically connected to an input cable that connects to the at least one input port 102*a*.

The at least one external power source may include a direct current generator (not shown), such as a dynamo. In an embodiment, a direct current generator converts kinetic energy from a kinetic energy source into electrical energy. The direct current generator may run on fuel; for instance the generator may run on gasoline. The generator may run on kerosene. The generator may be a diesel generator, capable of running on a number of natural and synthetic fuels. The generator may run on natural gas. In other embodiments, the direct current generator is driven by a heat engine; for instance, the direct current generator may be driven by a heat engine exploiting the temperature difference between a hot reservoir heated by the sun and a cold reservoir, such as a geothermal well. The direct current generator may be driven by a steam engine. In other embodiments, the direct current generator is driven by fluid flow; for instance, the direct current generator may include a wind turbine that harvests the kinetic energy of wind. The direct current generator may include a water turbine or a water wheel that harvests the kinetic energy of a local source of flowing water. The direct current generator may convert kinetic energy stored in a physical system, such as a flywheel, into electrical energy. The direct current generator may convert kinetic energy converted from potential energy stored in a physical system, such as a spring or weight, into electrical energy. In some embodiments, the external power source 103*a-b* is a perpetual flywheel generator, which stores energy as kinetic energy in a spinning flywheel, and converts the energy to electricity, for example using a device that converts electrical energy to kinetic energy and vice-versa using electromagnetic induction; the current produced by the flywheel generator may be direct current, alternating current, or any other pattern of current.

The external power source 103*a-b* may include an electrochemical source, such as a battery. For instance, the electrochemical source may include a lead acid battery. The electrochemical source may include a lithium ion battery. The electrochemical source may include a nickel-cadmium battery. The electrochemical source may include a nickel-metal hydride battery. The electrochemical source may include any rechargeable battery. The electrochemical source may include any non-rechargeable battery. The electrochemical source may include a flow battery. In some embodiments, the electrochemical source includes a fuel cell. The external power source 103*a-b* may include a capacitor; for instance, the external power source 103*a-b* may include a supercapacitor, such as a graphene film supercapacitor. The external power source 103*a-b* may include an inductor; for instance, the external power source 103*a-b* may include a superconducting magnetic energy storage device. The external power source 103*a-b* may include hybrid devices, such as an ultrabattery, which combines electrochemical and capacitive electrical energy storage facilities.

Figure 3:
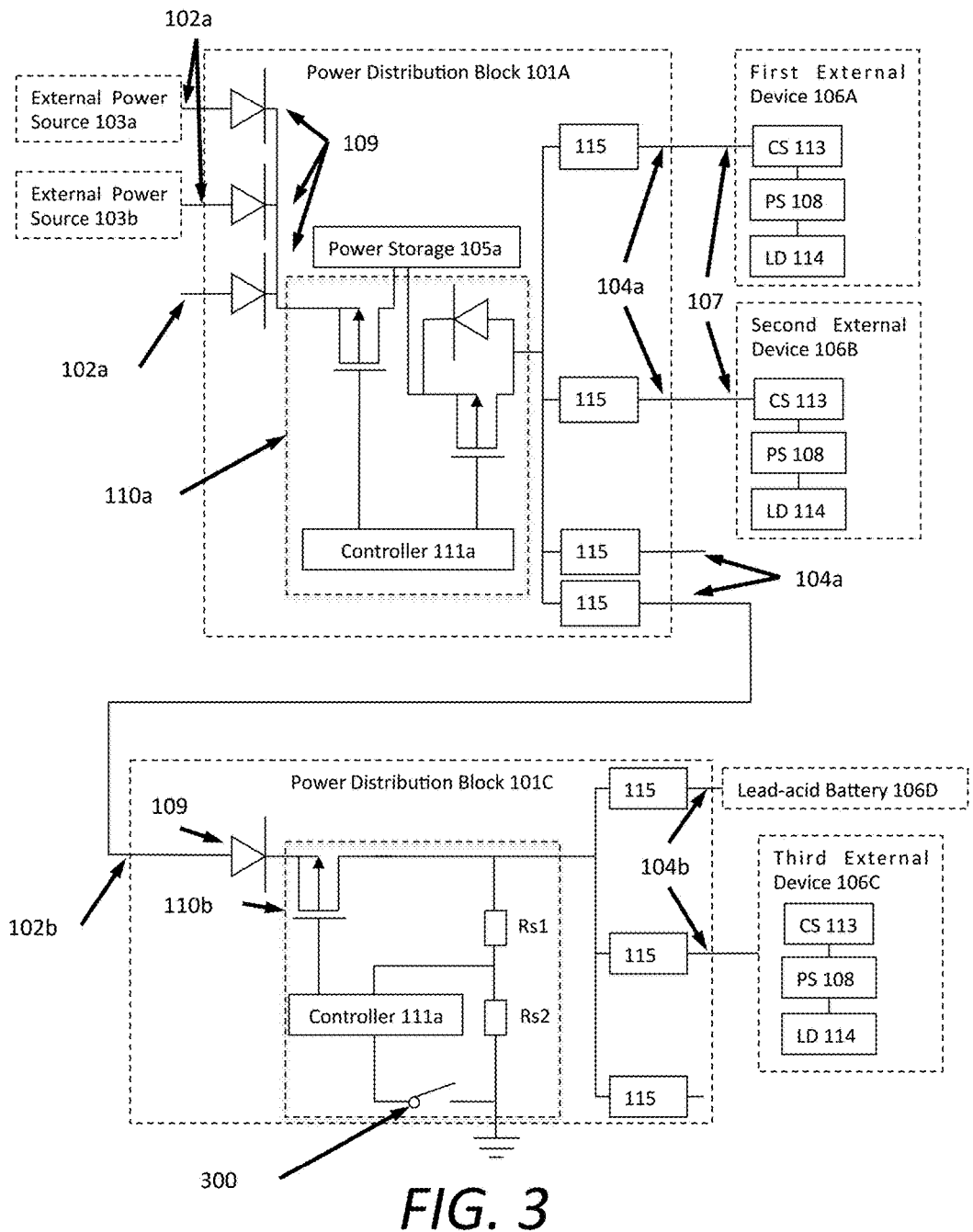
FIG. 3 is a circuit diagram illustrating one embodiment of the network.

In some embodiments, the external power source 103*a-b* includes at least one additional power distribution block. For instance, as illustrated in FIG. 3, the network 100 may include one power distribution block 101*c* receiving electrical power from a device connection port 104*a*, as described in further detail below, of another power distribution block 101*a*, via the input port 102*b* of the power distribution block 101*c*. In other embodiments, the external power source 103*a-b* includes at least one external device 106*a-c*.

The at least one external power source may include an alternating current (AC) power source combined with an adaptor configured to convert AC electrical power to direct current electrical power 103*b*. In an embodiment, an AC generator converts kinetic energy from a kinetic energy source into AC electrical energy. The AC power source 103*b* may include a line on an electrical grid, such as a grid connected via a system of power lines and transformers to one or more power plants; the power plants and grid may be operated by utility companies or agencies. AC power source 103*b* may include a local AC electrical generator (not shown) that runs on fuel; for instance the generator may run on gasoline. The generator may run on kerosene. The generator may be a diesel generator, capable of running on a number of natural and synthetic fuels. The generator may run on natural gas. In other embodiments, the AC generator is driven by a heat engine; for instance, the AC generator may be driven by a heat engine exploiting the temperature difference between a hot reservoir heated by the sun and a cold reservoir, such as a geothermal well. The AC generator may be driven by a steam engine. In other embodiments, the AC generator is driven by fluid flow; for instance, the direct current generator may include a wind turbine that harvests the kinetic energy of wind. The AC generator may include a water turbine or a water wheel that harvests the kinetic energy of a local source of flowing water. The power distribution block 101*a* may connect to the AC power source via a wall plug 103*b*; the wall plug may include an adaptor circuit (not shown) for converting AC to direct current. The adaptor circuit may include one or more diodes; for instance the adaptor circuit may include a full-wave or half-wave rectifier. The adaptor circuit may include one or more smoothing capacitors or inductors. The AC generator may convert kinetic energy stored in a physical system, such as a flywheel, into electrical energy. The AC generator may convert kinetic energy converted from potential energy stored in a physical system, such as a spring or weight, into electrical energy.

The network 100 may include at least one voltage converter (not shown) to adjust the input voltage to an acceptable level for the network 100. The at least one voltage converter may be incorporated within the power distribution block 101*a*; in some embodiments the at least one voltage converter is controlled by a controller 111*a* included in the power distribution block, as described in further detail below. The voltage converter may include a transformer, for converting the voltage level received from an AC source as described above in relation to FIGS. 2A-2C; the transformer may connect the AC source to the adaptor described above. The transformer may be variable; for example, the transformer may be controlled by a control circuit, such as the controller 111*a* of the power distribution block 101*a*, which may sense a voltage of the incoming AC signal (for example, the root-mean-square voltage or peak voltage of the signal), or the voltage needs of the network 100 and adjust the adjustable transformer to achieve the desired voltage conversion ratio. The at least one voltage converter may be a flyback converter. The at least one voltage converter may include a direct current step-down converter, such as a buck converter that uses the opposing voltage of an inductor in series with a voltage source, combined with a periodic duty cycle maintaining a particular average voltage drop across the inductor, to reduce the output voltage of the converter; a controller, such as the controller 111a of the power distribution block, may regulate the duty cycle to achieve the requisite conversion ratio, for instance using a transistor. The buck converter may include one or more elements to ensure a substantially constant voltage output, such as a smoothing capacitor or Zener diode. The at least one voltage converter may include a step-up converter, such as a boost converter that uses the additional voltage of a series inductor, as regulated by a duty cycle, to augment the output voltage of the converter; a controller, such as the controller 111 of the power distribution block, may regulate the duty cycle to achieve the requisite conversion ratio, for instance using a transistor. In some embodiments, the voltage converter includes a buck-boost converter, which uses a series inductor and capacitor either to increase or decrease the output voltage, as determined by a duty cycle; a controller, such as the controller 111 of the power distribution block, may regulate the duty cycle to achieve the requisite conversion ratio, for instance using a transistor.

Figures 2A, 2B:
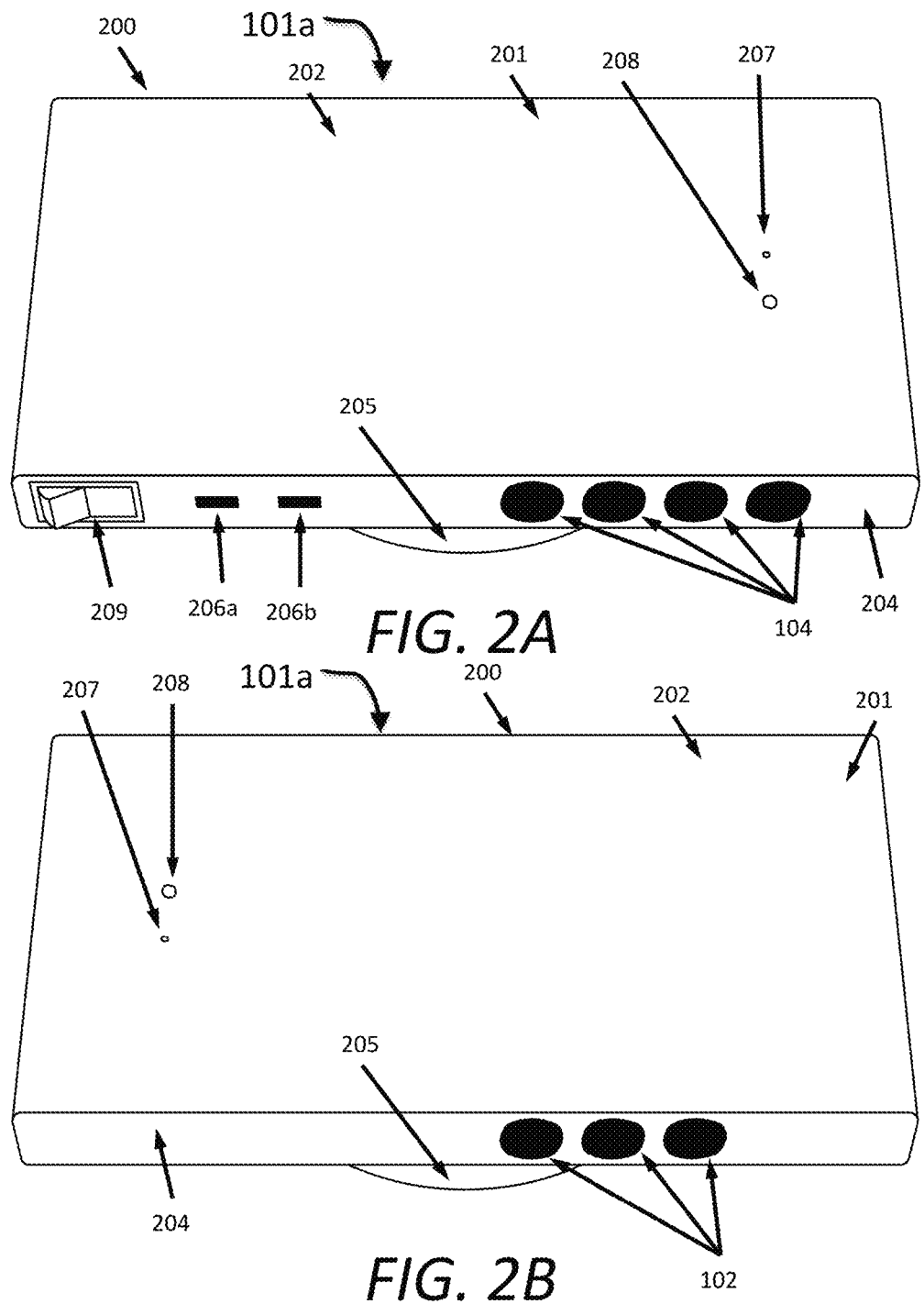
FIG. 2A is a schematic diagram depicting one embodiment of a power distribution block.
FIG. 2B is a schematic diagram depicting one embodiment of a power distribution block.
Figure 2C:
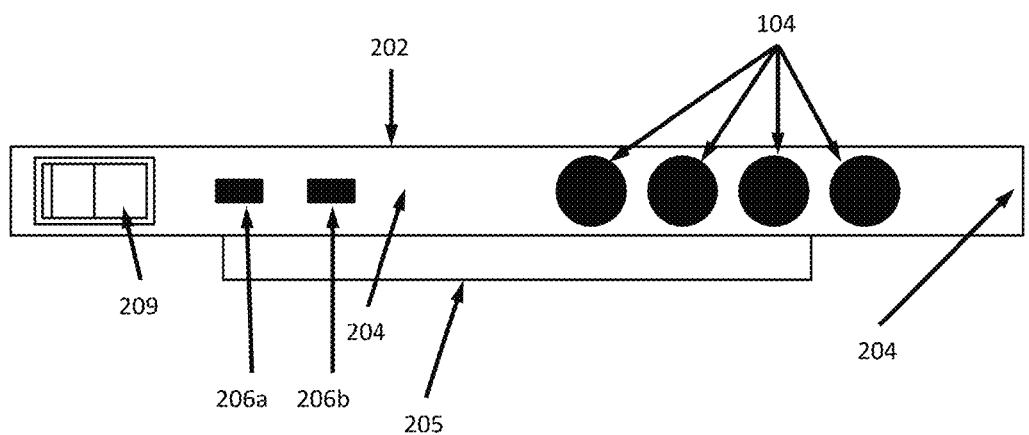
FIG. 2C is a schematic diagram depicting one embodiment of a power distribution block.
Figure 2D:
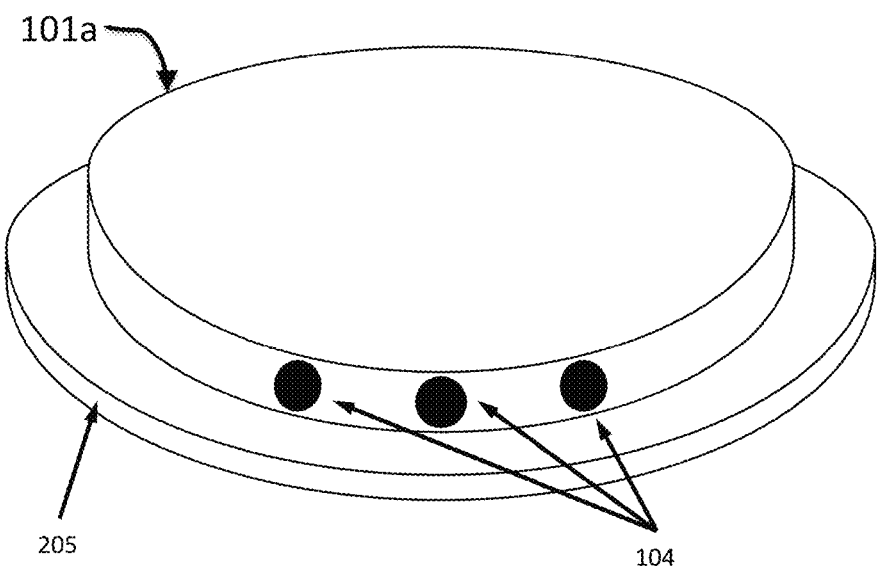
FIG. 2D is a schematic diagram depicting one embodiment of a power distribution block.

The power distribution block 101a may have at least one main power storage device 105a. The at least one main power storage device 105a may be any device that stores energy for production of electricity as described above for external sources 103a-c, including kinetic or potential energy storage such as springs or flywheels, and storage in capacitors or inductors. The at least one main power storage device 105a may include an electrochemical power storage device, such as a battery. For instance, the at least one main power storage device 105a may include a lead acid battery. The at least one main power storage device 105a may include a lithium ion battery. The at least one main power storage device 105a may include a nickel-cadmium battery. The at least one main power storage device 105a may include a nickel-metal hydride battery. The at least one main power storage device 105a may include any rechargeable battery. The at least one main power storage device 105a may include a flow battery. The at least one main power storage device 105a may include a capacitor; for instance, the at least one main power storage device 105a may include a supercapacitor, such as a graphene film supercapacitor. The at least one main power storage device 105a may include an inductor; for instance, the at main least one power storage device 105a may include a superconducting magnetic energy storage device. The at least one main power storage device 105a may include hybrid devices, such as an ultrabattery, which combines electrochemical and capacitive electrical energy storage facilities. As illustrated in FIG. 2A, the power distribution block 101a may have a charging indicator light 207 that indicates the charging status of the at least one main power storage device 105a; the charging indicator light 207 may be controlled by the controller 111a as set forth in further detail below. As a non-limiting example, the charging indicator light may indicate charging by glowing constantly, and may indicate that the at least one main power storage device 105a is fully charged by blinking. The power distribution block 101a may include a power level indicator light 208 to signal the degree to which the main power storage device 105a has discharged, which may be controlled by the controller 111a as set forth in further detail below. As a non-limiting example, the power level indicator light 208 may glow green when the at least one main power storage device 105a is fully charged, may glow blue when the at least one main power storage device 105a contains power within an intermediate range of power levels, and may glow red when the main power storage device 105a is nearly fully discharged; the intermediate level may, for instance, range from 95% charged to 21% charged, while the "fully charged" level may correspond to the at least one main power storage device 105a being from 95% to 100% charged, and the nearly discharged range may cover the range from 20% to 1% charged. The power distribution block 101a may include one or more anti-chargeback diodes 109 to prevent the flow of electrical power from the at least one main power storage device 105a to the one or more external power sources 103a-b. The power distribution block 101a may have a maximum output of 3A; in some embodiments, for instance, the block 101a can power a 24 W 12 VDC TV up to 2 hours on full charge.

In some embodiments, the power distribution block 101a includes a control circuit 110a. The control circuit 110a may include a clock (not shown) to measure time and to regulate duty cycles. The control circuit 110a may include a controller 111a. The controller 111a may be implemented using an integrated circuit board. The controller 111a may include a processor, such as a microprocessor. The controller 111a may include one or more logic gates constructed using semiconductor circuit elements, such as diodes and transistors; logic gates may include, without limitation, boolean "and," "or," and "xor" gates. The gates may treat a given input voltage level as a threshold distinguishing between Boolean "true" and "false" values; for instance, values equal to or above the threshold may be treated as Boolean "true" inputs, while values below the threshold may be treated as Boolean "false." Where the input value is from a sensor, the value may be calibrated by an intermediate element, such as an analog to digital converter, prior to the relevant gate input; for example, the intermediate element may include an operational amplifier that converts the range of likely voltage signals from sensors into a range relevant to the threshold requirements of the logic gate. The controller 111a may include one or more other combinations of circuit elements to modulate or alter input signals as necessary to achieve useful threshold inputs; the additional combinations may include high-pass filters to ignore minor fluctuations in input signals, low-pass filters to ignore temporary surge inputs or other outliers, rectifying devices to obtain absolute values, or smoothing, averaging, or integrating devices to interpret a range of inputs over a duration of time measured in duty cycles, pulse frequencies, or other absolute or relative durations. The controller 111a may have one or more devices serving as memory; in some embodiments, the memory is a digital memory device such as a solid-state or "flash" memory. In other embodiments, particular memory tasks are performed by particular circuit elements; for instance, a numerical value representing net charge in an object may be represented by a net charge stored in a capacitor.

The control circuit 110a may include one or more sensors (not shown). The sensors may be integrated in the controller 111a. The sensors may be external to the controller 111a. The one or more sensors may include one or more ammeters. The one or more sensors may include one or more voltmeters. The one or more sensors may include one or more ohmmeters. In some embodiments, the one or more sensors sense reactance of a circuit element. In other embodiments the one or more sensors sense the capacitance of a circuit element. The one or more sensors may sense the inductance of a circuit element. The one or more sensors may sense the magnetic flux through a given location. The one or more sensors may sense the electrical charge in an element; for instance, the one or more sensors may include an electrometer. The one or more sensors may include a Hall-effect sensor to detect magnetic fields. The one or more sensors may detect electric fields. The one or more sensors may detect the phase and amplitude properties of the network 100 or of a portion of the network 100. The one or more sensors may include a spectrum analyzer.

The one or more sensors may detect the level of charge in the at least one main power storage device 105*a*; in some embodiments, the one or more sensors detect the level of charge by measuring the voltage level of the at least one main power storage device 105*a*. In other embodiments, the one or more sensors may detect the level of charge by coulomb-counting: constantly monitoring the current flowing into or out of the at least one main power storage device 105*a* and maintaining a "balance" representing the total quantity of power accumulated in the main power storage device 105*a* based on the flow of current; in some embodiments, the "balance" calculation is calibrated to assume a certain degree of power loss due to non-ideal main power storage device 105*a* technology. The controller 111*a* may maintain the level of charge calculations in the controller's memory. In some embodiments, the level of charge is calculated by a combination of the above methods; for instance, the initial charge in the at least one main power storage device 105*a* may be calculated using a voltage measurement, and adjustments to the charge level during charging or discharging may be calculated via the coulomb-counting method, or a similar method.

The one or more sensors may sense the power level in another power storage device, such as a device connected to the device connection ports 104*a* or to the at least one input port 102*a*, by similar means; for instance, the controller 111*a* may determine the initial charge level of a power storage device newly connected to the at least one input port 102*a* or to the device connection ports 104*a* by measuring its voltage level, and modify the detected charge level by coulomb-counting. In other embodiments, the power storage device connected to the device connection port 104*a* or the input port 102*a* may have its own charge-level sensing and calculation system, and may signal its charge level to the controller; as an example, the signal may be implemented by modulating the voltage or current input to the device connection port 104*a* or the input port 102*a* according to a pattern linked in the memory of the controller 111*a* to a particular level of charge. The at least one external device 106*a* may implement the sensing and signaling process as described in further detail below. In other embodiments, devices may signal each other wirelessly, for instance using the wireless communication components 116 of the power distribution blocks, as described below in reference to FIG. 1A, and the wireless communication components 416 of the external device 106*a* as described below in reference to FIG. 4A.

In some embodiments, the control circuit 110*a* reacts to sensor input by activating one or more circuit elements; for instance, the controller 111*a* may be configured to analyze one or more sensor inputs and perform pre-programmed responses to the stimuli. In some embodiments, the controller 111*a* adjusts the power to one or more indicator lights. For instance, the controller 111*a* may cause the charging indicator light 207 to shine constantly while current is flowing into the at least one main power storage device 105*a*, as measured by one or more ammeters in communication with the controller 111*a*. The controller may cause the charging indicator light 207 to blink when sensing that the at least one main power storage device 105*a* is fully charged; the controller 111*a* may have stored in memory a threshold charge amount representing the maximum charge that may be stored in the main power storage device 105*a*, and cause the charging indicator light to blink upon receiving charge level information from the one or more sensors indicating that the threshold level has been achieved. Likewise, the controller may cause the power level indicator light 208 to glow green when the charge level in the at least one main power storage device 105*a* achieves the range associated with a "fully charged" value, as described above in reference to FIGS. 2A-2B, to glow blue when the charge level is in the range associated with an intermediate power level as described above in reference to FIGS. 2A-2B, and to glow red when the charge level is associated with a low or nearly fully discharged power level as described above in reference to FIGS. 2A-2B.

In some embodiments, the controller 111*a* switches on or off one or more transistors in response to sensor input. In one embodiment, the control circuit 110*a* implements overcharge prevention by switching off a transistor 112*a-c*, such as a transistor 112*c* controlling the connection from the at least one input port 102*a* to the at least one main power storage device 105*a*, upon detecting that the at least one main power storage device 105*a* is fully charged; in an embodiment, the overcharge protection prevents the at least one main power storage device 105*a* from being damaged by attempts to charge the at least one main power storage device 105*a* past its capacity. In another embodiment, the control circuit 110*a* implements overcharge protection for an external device connected to the at least one device connection port 104*a* by switching off a transistor 112*a*, such as a transistor 112*a* controlling the connection between the at least one main power storage device 105*a* and the at least one device connection port 104*a*.

In some embodiments, the control circuit 110*a* implements load sharing between devices in the network 100. As an example, the controller 111*a* may detect that the main power storage device 105*a* has a charge that has fallen beneath a certain threshold, and may activate a transistor 112*a* to prevent the main power storage device 105*a* from expending further power to charge other devices in the network 100; the other devices may remain able to charge the main power storage device 105*a*, for instance by way of a diode 113 permitting current to flow toward a positive terminal of the main power storage device 105*a*, while preventing current from flowing away from the main power storage device 105*a*. In other embodiments, as set forth in further detail below, the controller 111*a* detects that one or more first external devices has a low charge level, and permits at least one device in the network 100 having a higher charge level to charge the one or more first devices; for instance, the controller 111*a* may have transistors (not shown) controlling charge flowing either into or out of device connection ports 104*a*, and may use those transistors to prevent charge from flowing out of the undercharged devices, and allow charge to flow into the undercharged devices, while allowing charge to flow out of the devices having more charge.

In some embodiments, the control circuit 110*a* implements surge protection, by detecting that a measurement concerning the electricity flowing through a given point in the network 100 exceeds a threshold stored in memory of the controller 111*a*, and switching off a transistor to protect one or more devices in the network. The threshold may be a voltage threshold, as compared to a voltage detected by a voltmeter. The threshold may be a current threshold, as compared to a current detected by an ammeter. The threshold may be a numerical value. The threshold may include signal characteristics associated with the detected value; for instance, a spike in voltage or current lasting less than a particular duration may be ignored. The value to compare to the threshold may be detected at any point in the power distribution block 101a; for instance, the value may be detected at an input port 102a. The value may be detected at a device connection port 104a. The value may be detected at a terminal of the main power storage device 105a. The threshold may depend on the particular kind of device connected to the power distribution block 101a; for instance, where the power distribution block 101a includes a manual switch allowing the user to signal to the controller 111a the kind of device connected, the controller 111a may be further configured to use a first surge threshold when the manual switch is in the first state and to use a second surge threshold when the manual switch is in the second state.

In some embodiments, the power distribution block 101a includes at least one device connection port 104a. The device connection port may be any port suitable for use as the input port 102a as described above in reference to FIGS. 2A-2C. The at least one device connection port 104a may be configured to connect to an additional device, such as an external device 106a-c as described in further detail below. The at least one device connection port 104a may include one or more voltage converters (not shown). The voltage converters may be step-down or buck converters as described above in reference to FIG. 1B. The voltage converters may be step-up or boost converters as described above in reference to FIG. 1B. The voltage converters may be combination buck-boost converters as described above in reference to FIG. 1B. The voltage converters may be operational amplifiers. The control circuit 110a may be configured to modify the electrical signal sent to the at least one device connection port 104a to ensure that the signal optimally provides power as needed by the device connected to the device connection port 104a. For instance, if the device connected to the device connection port 104a must receive a level of voltage, the controller 111a may be configured to direct the voltage level converter to send that level of voltage to the device connection port 104a to which the device is connected. In some embodiments, the controller 111a sends the connected device a constant signal, for instance by operating the one or more voltage converters in continuous mode. In other embodiments, the controller 111a sends a pulse pattern to the connected device. In additional embodiments, the controller 111a activates an inverter circuit to send an alternating current signal to the connected device; for instance, the connected device may be an AC motor, requiring an AC signal.

Figure 6A:
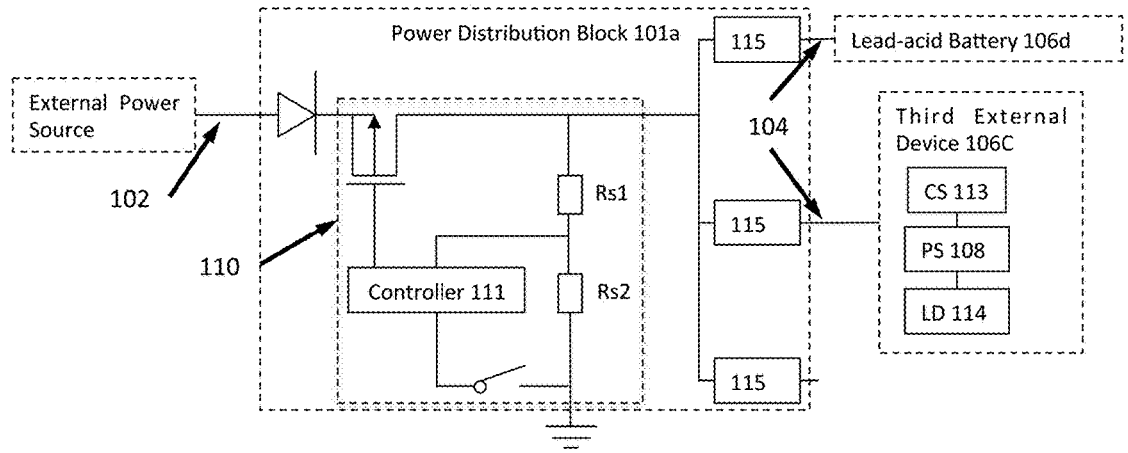
FIG. 6A is a circuit diagram depicting one embodiment of the network.

The controller 111a may combine the above elements; for instance, if the device connected to the device connection port 104a is a lead acid battery 106d, as shown in FIGS. 1A, 3, and 6A, the controller 111a may be configured to cause the device connection port 104a to send a constant current at about 2.3 to 2.45 V per lead-acid cell, to convert to a lower "top-off" current to complete charge when the lead-acid battery is nearly completely charged, and to convert to a lower "float current" to match the lead-acid battery's self-discharge rate. If the device connection port 104a is connected to an external device containing a lithium ion battery, the controller 111a may output a charge at a voltage of 3.8 to 4.2 V per cell; the charge may be sent as a pulse current.

In some embodiments, a user of the network 100 selects the current profile to be sent to a device connection port 104a using a manual switch; FIG. 3 illustrates a power distribution block 101c with a first circuit containing a first resistor connected to the controller 111b, and a second resistor on a circuit attached to a manual switch; thus, the controller 111b may be configured to apply a first load external device charging characteristic when the manual switch is in the first state, and to apply a second load sharing charging characteristic when the manual switch is in the second state. As an example, when the switch is open, only the first circuit may have current, signaling that one kind of device, such as a device containing a lithium ion battery, is connected to the at least one output port 104a, and when the switch is closed, the current also may pass through the second resistor, causing the controller to sense a different voltage drop over the circuit, and signaling to the controller that a different device, such as lead acid battery, is connected to the at least one output port 104a.

In some embodiments, the power distribution block 101a includes at least one wireless communication component 116. The at least one wireless communication component 116 may be any component that allows the controller 111a to communicate with other devices. The wireless communication component 116 may be an antenna. The wireless component may be a near-field communication device. In some embodiments, the wireless communication component 116 conveys data to the controller 111a; the data may describe another device attached to the network 100, such as an external device 106a-c as described in further detail below. The data may include a charging profile of the device; for instance, if the device has a particular charging requirement that must be followed to charge the device without damaging it, the data may describe that requirement. The data may describe the current state of the device; for instance, the data may describe the charging level of the device.

In some embodiments, the controller 111a is configured to sense a load sharing threshold event and to activate the at least one transistor 112a in response to the load sharing threshold event. In one embodiment, a load sharing threshold event is an event requiring the controller 111b to modify the circuit to transfer power from one device to another. For example, in embodiments where the network 100 contains a first power distribution block 101a having a first main power storage device 105a and at least one first transistor 112a controlling the connection from the first main power storage device 105a to the first plurality of device connection ports, and at least one external device 106a-c, the controller 111a may be configured to sense a load sharing threshold event matching a load sharing threshold and change the state of the at least one transistor 112a. In one embodiment, the load sharing threshold represents a ratio of the power stored in the first main power storage device 105a to the power stored in the individual power storage device 108 of the at least one first external device 106a-c. For instance, when the power in the main power storage device 105a is less than the power stored in the at least one external device 106a-c, the controller 111 may be configured to shut off current through the transistor, so that the at least one external device 106a-c can charge the main power storage device 105a, but the main power storage device 105a cannot charge the at least one external device 106a-c. This may happen when the at least one external device 106a-c includes an external device 106b that recently was connected to one of the device connection ports 104a, and the external device 106b is fully charged, so that the ratio of charge in the at least one external device 106a-c to that in the main power storage device 105a is increased; the controller 111a may then cause the newly connected external device 106b to charge the main power storage device 105a. In other embodiments, the ratio of the power in the external devices to that of the main power storage device 105a drops below a certain point, and the main power storage device 105a may switch on the at least one transistor 112a, permitting the main power storage device 105a to charge the at least one external device 106a-b. This may occur if the transistor 112a was switched off to allow one of the devices 106b to charge the main power storage device 105a; the transistor may then be switched back on to redistribute the load between external devices. In other embodiments, the controller 111a may keep the at least one transistor 112a switched off when the devices are fully charged, until they have used a certain quantity of power to drive loads, and then may switch on the transistor 112a to charge the devices to a particular level; for instance, keeping lithium ion batteries perpetually at a fully charged status may increase wear to the lithium ion batteries, reducing their useful lives, and the controller 111a may be programmed to allow the lithium ion batteries to discharge and recharge in periodic cycles, if the external devices use such batteries as individual power storage devices 108. As another example, a new external device 106b having little remaining charge may be connected to the at least one device connection port 104a; the device 106b may be a mostly discharged lead acid battery, for instance, or a lamp that was used in table-top mode as disclosed in further detail below, until nearly fully discharged. In that case, the main power storage device 105a may be caused by the controller 111 to charge the newly connected external device 106b.

In some embodiments, the at least one transistor 112b includes a transistor that controls the connection to a particular device connection port 104a. In some embodiments, there is a transistor controlling the connection to each device connection port. The controller 111a may change the state of each individual transistor in response to one or more load sharing threshold conditions. Thus, when one external device 106a is fully powered up, and another external device 106b is largely discharged, the transistor connecting the main power storage device 105a to the fully charged external device 106a may be shut off, allowing the external device 106a to charge the main power storage device 105a, but not vice-versa; meanwhile, the transistor to the second external device 106b may be open to allow the main storage device 105a to charge the second external device 106b, so that the charge in the network 100 is more evenly distributed. Where there is a manual switch 300 to signal the type of device connected to the controller 111a, for instance as shown in FIG. 3 and as described in further detail below, the controller 111b may be further configured to use a first load sharing threshold when the manual switch 300 is in the first state, and to use a second load sharing threshold when the manual switch 300 is in the second state. For instance a lead acid battery may require more frequent charging than a lithium ion battery, due to loss of charge over time. Likewise, some batteries must be fully discharged or fully charged on a periodic basis so that they do not "learn" to store less than their full capacity of power. In some embodiments, the load sharing ability of the network 100 maximizes the ability to exploit all of the power stored in the network, and allows the network to flexibly adjust to user actions.

In some embodiments, the network 100 further includes a second power distribution block 101b having a second housing, and a second plurality of device connection ports 104b in the second housing, with at least one of the second plurality of device connection ports 104b connected to at least one of the first plurality of device connection ports 104a. In some embodiments, the second power distribution block further includes a second main power storage device 105b. The second power distribution block 101b may have at least one second transistor 112b controlling the connection between the second main power storage device 105b and the second plurality of connection ports 104b, and at least one second controller configured to sense a load sharing threshold condition and to modify the state of the at least one second transistor 112b in response to the load sharing threshold condition. The at least one second controller 111b may use any load sharing threshold as described above in reference to FIG. 1B. At least one external device 106c may be connected to one of the plurality of device connection ports 104b. The second controller 111b may treat the first power distribution block 101a and all devices connected to it as a single external device connected to the second power distribution block 101b, for the purposes of load sharing threshold event responses. Likewise, the first controller 105a may treat the second power distribution block 101b and other devices connected to it as a single external device for the purposes of load threshold event responses. The second power distribution block 101b may have one or more external power sources connected to it; the one or more external power sources may be any external power source 103a-b as described above in reference to FIGS. 1A-1B.

Figure 1C:
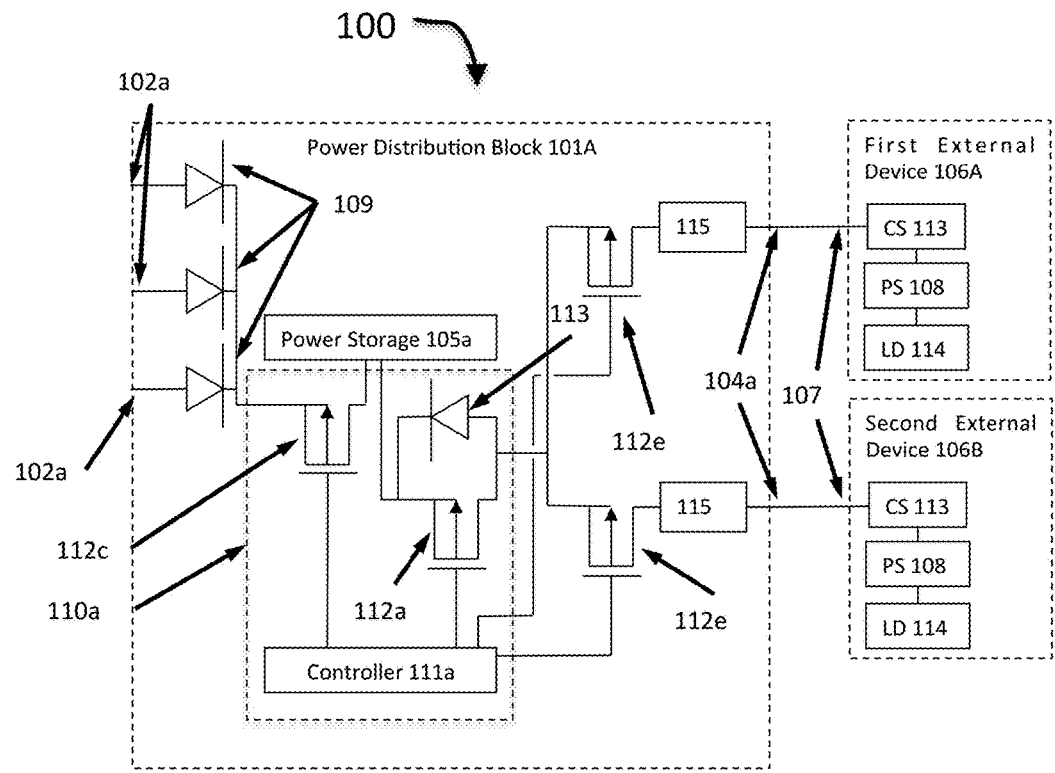
FIG. 1C is a circuit diagram illustrating one embodiment of a power distribution block.

In other embodiments, the second power distribution block 101b does not have a main power storage device. The second power distribution block 101b may have at least one second transistor 112e controlling the connection between at least two device connection ports of the second plurality of connection ports, and at least one second controller 111b configured to sense a load sharing threshold condition and to modify the state of the at least one second transistor in response to the load sharing threshold condition; for instance, the at least one second transistor 112e may operate to connect or disconnect each port 104a from the remainder of the circuit, as shown in FIG. 1C. The second controller may treat the first power distribution block 101a and devices connected to it as a single external device, for the purposes of load sharing threshold event responses. At least one external device 106c may be connected to one of the plurality of device connection ports 104b. In some embodiments, the load sharing threshold represents a ratio of the power stored in the first individual power storage device to the power stored in the second individual power storage device. In some embodiments, the controller 111b is further configured to use a first load sharing threshold when the manual switch is in the first state, and to use a second load sharing threshold when the manual switch is in the second state: for instance a lead acid battery may require more frequent charging than a lithium ion battery, due to loss of charge over time. Likewise, some batteries must be fully discharged or fully charged on a periodic basis so that they do not "learn" to store less than their full capacity of power. In some embodiments, as shown in FIG. 6A, the power distribution block 101a has no main power storage device, and performs load sharing or other power management as described above for a power distribution block 101b.

In some embodiments, as shown in FIG. 2A, the power distribution block 101a includes one or more universal serial bus (USB) ports 206a-b; the USB ports 206a-b may be configured to charge one or more USB-charging devices, such as mobile phones or tablets. In one embodiment, the power distribution block 101a includes a first USB port 206a with a 500 mA output, and a second USB port 206b with a 2 A output. In some embodiments, the power distribution block 101a has a power switch 209. The power switch may disengage one or more of the device connection ports 104a. The power switch may switch off the indicator lights 207, 208. In some embodiments, the controller 111a is configured to modify the output of the USB ports 206a-b as needed to operate the device connected to a USB port 206a-b. As an example, the controller 111a may detect the type of device connected to one of the USB ports 206a-b and cause the power output to the device to match a charging profile that the device requires. For instance, mobile devices, such as phones made by a first manufacturer, may require a very specific charging profile, and modifying that profile may cause those mobile devices to malfunction; mobile devices from a second manufacturer may have a different specific charging profile.

In some embodiments, a power distribution block 101a-b is embedded in a part, such as the ceiling, floor, or wall, of a structure, such as a dwelling or office. For instance, the power distribution block may be recessed within a niche (not shown) in a wall. The niche may be open, exposing the power distribution block to manipulation and connection by a user; the niche may be closable, for instance with a cabinet door analogously to an in-home fuse or circuit breaker box. In other embodiments, the niche or recess is covered over; for instance, the power distribution block 101a inserted in the recess may be covered over with a wall surface, such as drywall or other building or surfacing materials; manual controls such as switches 209 may be exposed. As an example, a manual switch 209 may take the form of a wall switch, such as a conventional light switch, allowing the power distribution block 101a to be controlled analogously to a dwelling's lighting system. Various combinations of the above configuration may also be used, such as covering the niche so that the power distribution block 101a is ordinarily accessible only via the manual switch 209, but including a door or other opening through which the device connection ports 104a and input ports 102a can be connected to or disconnected from other devices. Some cables connecting devices may be laid inside of the walls, ceilings, or floors in the manner of wiring used in dwellings, offices, and other buildings; for instance, the first power distribution block 101a may be connected via a wire within a wall to one or more external power sources 103a-c, while additional power distribution blocks 101b, devices, or additional power storage facilities may be connected via exposed or embedded wires, depending on the user's desire for stability, aesthetics, and flexibility of layout.

As illustrated in FIG. 1A-1B, in some embodiments, the network 100 includes one or more external devices 106a-b. Each of the external devices 106a-b may include a power exchange port 107. The power exchange port 107 may be any port suitable for use as the input port 102a described above in reference to FIGS. 1A-B. The power exchange port 107 may be connected to the at least one device connection port 104a. The connection may be made by an electric cable having a connector that can connect to the power exchange port 107 and a connector that can connect to the device connection port 104a. As an example, the cable may be a 10-meter coaxial cable. The at least one external device 106a-b may have an individual power storage device 108. The individual power storage device 108 may be any device suitable for use as the at least one power storage device 105. In some embodiments, the connection is made via an additional power distribution block 101b-c, as depicted in FIGS. 1B and 3. The connection from the device connection port 104a of the power distribution block 101a may be made to the additional power distribution block 101b via the device connection port 104b of the additional power distribution block 101b, as shown in FIG. 1B. The connection from the device connection port 104a of the power distribution block 101a may be made to the additional power distribution block 101c via the input port 102b of the additional power distribution block 101c, as shown in FIG. 3. In some embodiments, the use of an additional power distribution block 101b-c allows the user to extend the network 100, for instance into additional rooms in a dwelling; as an example, the light 106b in the adjacent room to that containing the power distribution block 101a in FIG. 1A may be connected directly via a cable from the power distribution block 101a, or a second power distribution block (not shown) may be connected to that cable, allowing light 106b to be placed in a more distant room, or creating a hub in the adjacent room to which several devices may be connected. In some embodiments, the additional power distribution block 101b-c also augments the load sharing capabilities of the network 100, as discussed above in reference to FIGS. 1A-3.

Figure 4A:
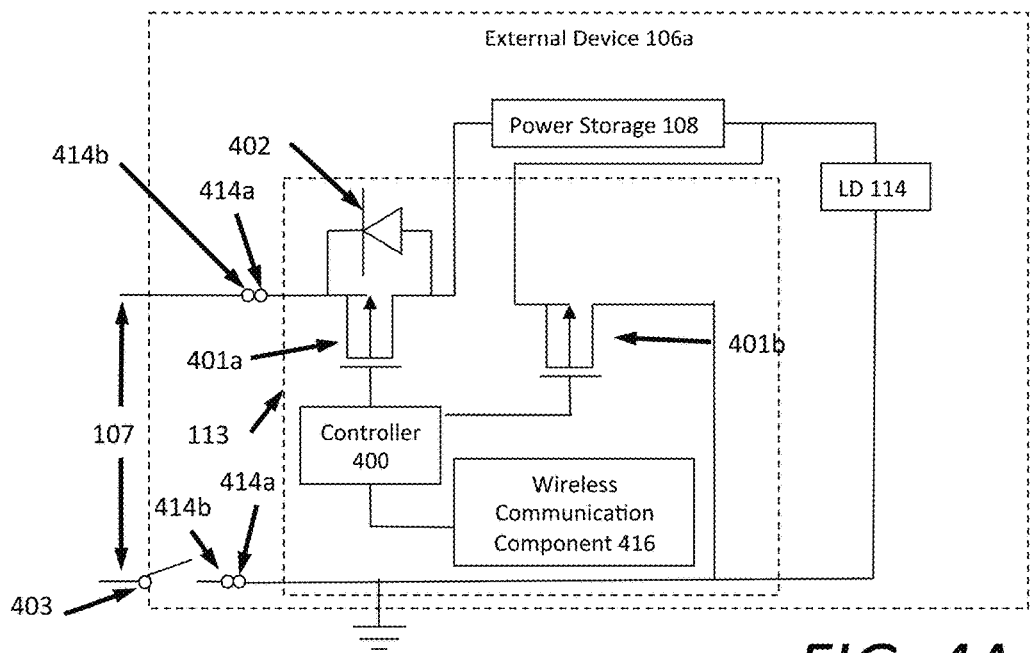
FIG. 4A is a circuit diagram illustrating one embodiment of an external device.

In some embodiments, the external device 106a-b has a control circuit 113. FIG. 4A is a circuit diagram illustrating one embodiment of an external device 106a. The control circuit 113 may include a controller 400. The controller 400 may be any controller suitable for use as a controller 111a for the power distribution block 101a as described above in reference to FIGS. 1A-B and 3. The controller 400 may be connected to one or more sensors (not shown) as described above in reference to FIGS. 1A-B. The control circuit 113 may include one or more transistors 401a-b operated by the controller 400. The controller 400 may operate the one or more transistors 401a-b in response to input from the one or more sensors; for instance, the controller may switch off a transistor 401a controlling the flow of charge from the power exchange port 107 to the individual power storage device 108 upon detecting that the individual power storage device 108 is fully charged; the detection may be performed as described above in reference to FIGS. 1A-B. Likewise, the controller 400 may perform surge protection by switching off the transistor 401a in response to a voltage or current signal passing through the power exchange port 107 that exceeds a particular threshold, as described above for surge protection procedures in reference to FIGS. 1A-B. In some embodiments, the individual power storage device 108 is still able to provide power to other devices on the network 100 for load sharing purposes; for instance, a diode 402 may provide a route around the transistor 401a which allows the individual power storage device 108 to charge one or more other devices on the network 100, while preventing the network 100 from charging the individual power storage device 108. The controller 400 may activate a transistor 401b to complete a circuit including the individual power storage device 108 when the load 114 is disengaged, as set forth in further detail below, for the purposes of load balancing, charging, and discharging, and switch off the transistor 401b when the load is engaged. The controller 400 may be connected to a wireless communication component 416. The wireless communication component 416 may be any wireless communication component as described above in reference to FIGS. 1A-1C.

In some embodiments, the controller 400 is configured to sense a load sharing threshold and to change the state of the second transistor in response to the second load sharing threshold. The load sharing threshold may be a load sharing threshold as defined above in reference to FIGS. 1A-3. In some embodiments, the load sharing threshold represents a ratio of the power stored in the individual power storage device to the power stored in at least one external power storage device connected to the power exchange port 107. For instance, the controller 400 may sense that one or more power sources connected to the power exchange port by means of the network 100 currently contain a large amount of electrical power, while the individual power storage device 108 has relatively little charge; the controller 400 may cause a transistor 401*a* to shut off current permitting the individual power storage device 108 to charge other power sources. In other embodiments, the individual power storage device 108 is fully charged, and the device closes a transistor 401*a* so that other devices cannot continue to charge the power storage device 108; a diode 402 may permit the individual power storage device 108 to continue charging other devices. In some embodiments, the configuration of the controller 400 complements the configuration of the controller 111 of the power distribution block 101*a*; for instance, in circumstances in which the main power storage device 105*a* is being used to distribute power from a fully charged power storage device to the rest of the network 100, the controller 400 may determine when the individual power storage device 108 is sufficiently charged, and change the state of a transistor 401*a* to stop the individual power storage device 108 from charging further.

The at least one external device 106*a-b* may include a load 114. In an embodiment, the load 114 is a circuit or element that consumes electrical power to achieve some use, allowing the at least one external device 106*a-b* to function as an appliance. The load 114 may include a motor; for instance, the at least one external device 106*a-b* may be an electric fan or a water pump. The load 114 may include a heating element; for example, the external device 106*a-b* may be a hair drier, an electric heater, or a heat pump. The load 114 may include a compressor; as an example, the external device 106*a-b* may be an air conditioner or refrigerator. The at least one external device 106*a* may include a switch 403 that controls power output to the load 114; the switch 403 may be a manual switch. The switch 403 may be a two-mode switch, having on and off positions. The switch 403 may have three or more modes corresponding to different power levels supplied to the load, such as required to produce varying motor speeds, or light levels. The switch 403 may be a dimmer switch. The switch may have mechanical means to produce the different switching modes; for instance, the switch may be a capacitive dimmer switch or TRIAC dimmer switch. Alternatively, the switch may not directly connect the load circuit 114, but instead may serve to send a signal to the controller 114, causing the controller to close the load circuit according to one or more switch modes stored in memory of the controller 114.

Figure 4B:
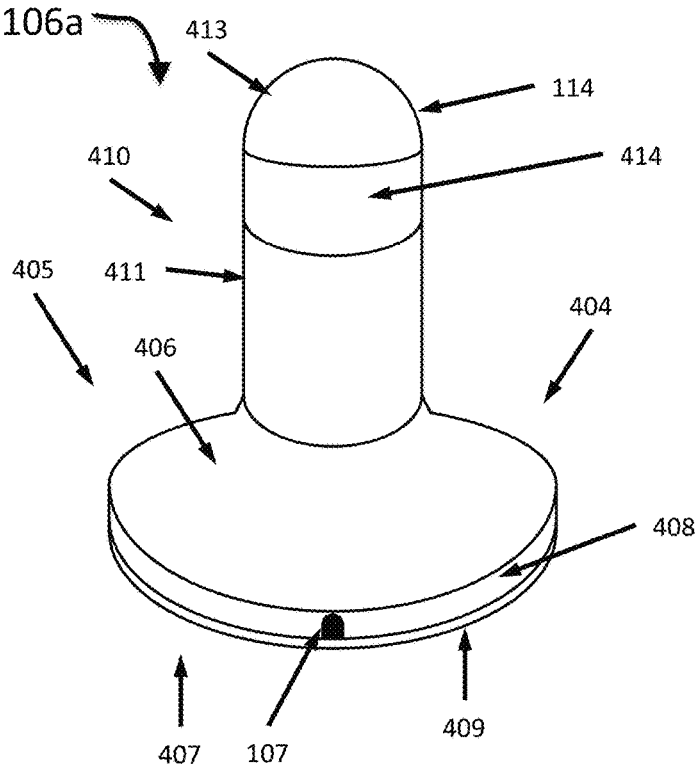
FIG. 4B is a schematic diagram depicting one embodiment of an external device.
Figure 4C:
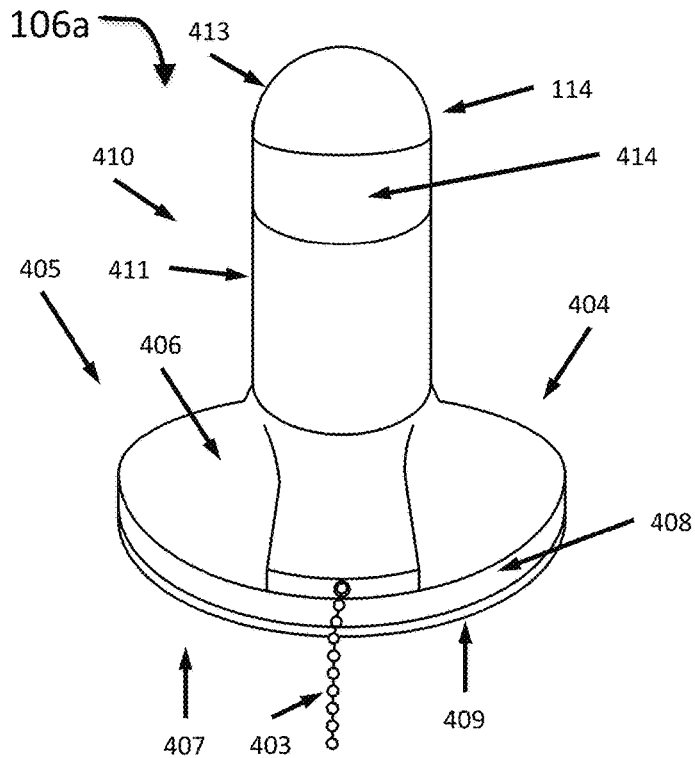
FIG. 4C is a schematic diagram depicting one embodiment of an external device.

In some embodiments, the load includes at least one electric light-emitting component, which converts electric energy into electromagnetic radiation. The electric light-emitting component may emit any form of electromagnetic radiation. The electric light-emitting component may emit visible light. In one embodiment, the electric light-emitting component is an electroluminescent device, which uses the electroluminescent effect to produce at least part of its light; for instance, the electric light-emitting component may be an LED. In another embodiment, the electric light-emitting component produces light via the incandescent effect, for instance by heating a filament until it glows, as in an incandescent light bulb. In another embodiment, the electric light-emitting component produces light by exciting a gas, as in a "neon" lamp. In yet another embodiment, the electric light-emitting component is a laser. In some embodiments, the electric light-emitting component employs the use of phosphors. Some embodiments of the electric light-emitting component emit light in part via fluorescent materials; for example, the electric light-emitting component may produce ultraviolet light by exciting a gas, and convert it to visible light using a fluorescent material that absorbs ultraviolet light and emits visible light. As another example, the electric light-emitting component may use the electroluminescent effect to produce visible light in one or more wavelengths while a fluorescent material in the electric light-emitting component absorbs light in those wavelengths and releases light in another set of wavelengths. Some embodiments of the electric light-emitting component may emit light in part via phosphorescent materials, which absorb energy and release it gradually as light; for instance, the electric light-emitting component may release light in short pulses, which is absorbed and re-emitted more gradually by phosphorescent material, producing a smoother light output. A remote phosphor may be placed between the electric light-emitting component and the area to be illuminated, for instance where a lens 413 might be placed as shown in FIG. 4B-C and described in further detail below. The remote phosphor may convert the light from a set of point sources, such as blue LED chips, into a more uniformly distributed source of illumination. The remote phosphor may emit light in a different color from the LED chips, or in a broader or narrower spectrum of colors. The light-emitting component may include one or more solar collectors, which transmit natural sunlight into light fixtures, for instance, using fiber-optic cables linked to light-collecting lens arrays. The light-emitting component may include one or more organic light-emitting diodes (OLED).

Figure 4D:
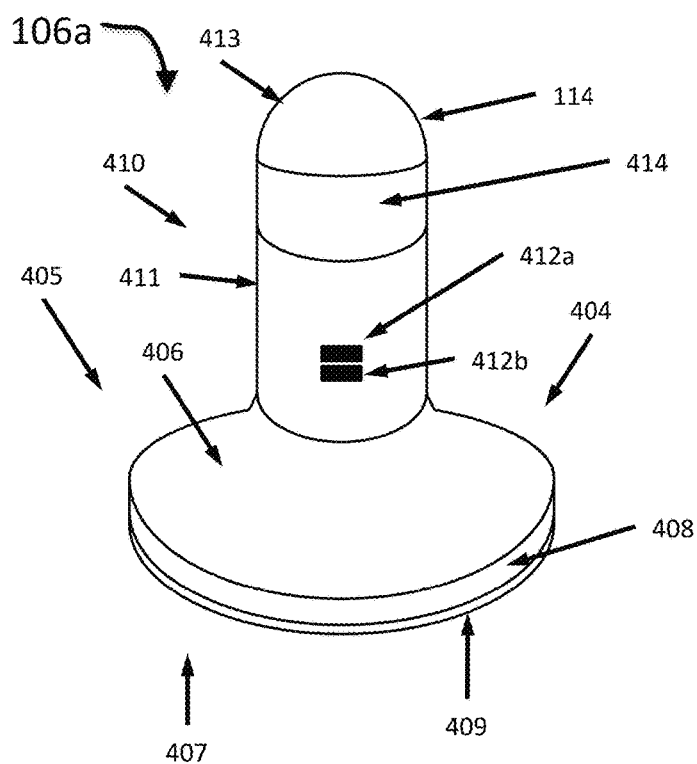
FIG. 4D is a schematic diagram depicting one embodiment of an external device.
Figure 4E:
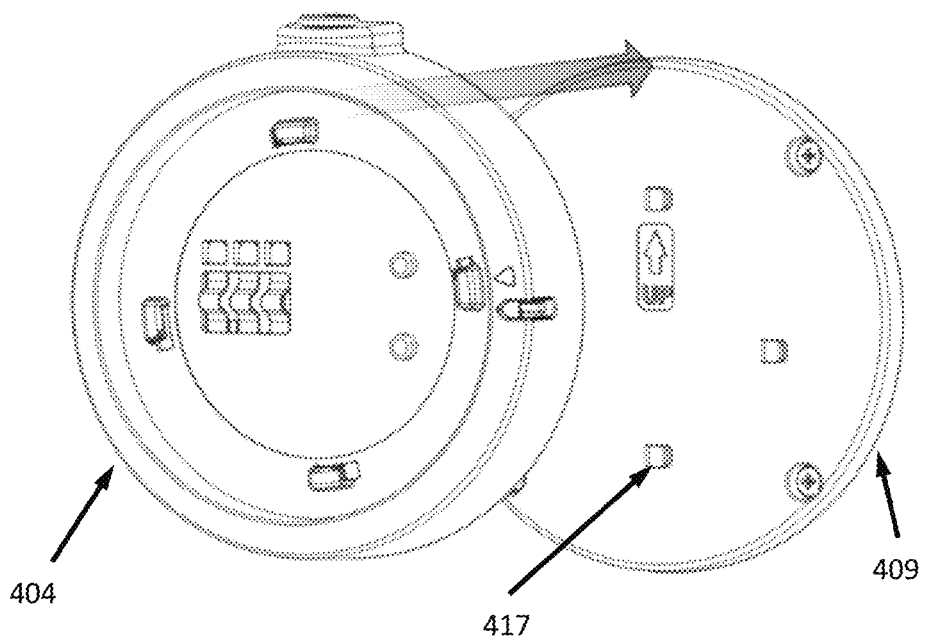
FIG. 4E is a schematic diagram depicting the assembly of a base and mounting bracket of one embodiment of an external device.
Figure 4F:
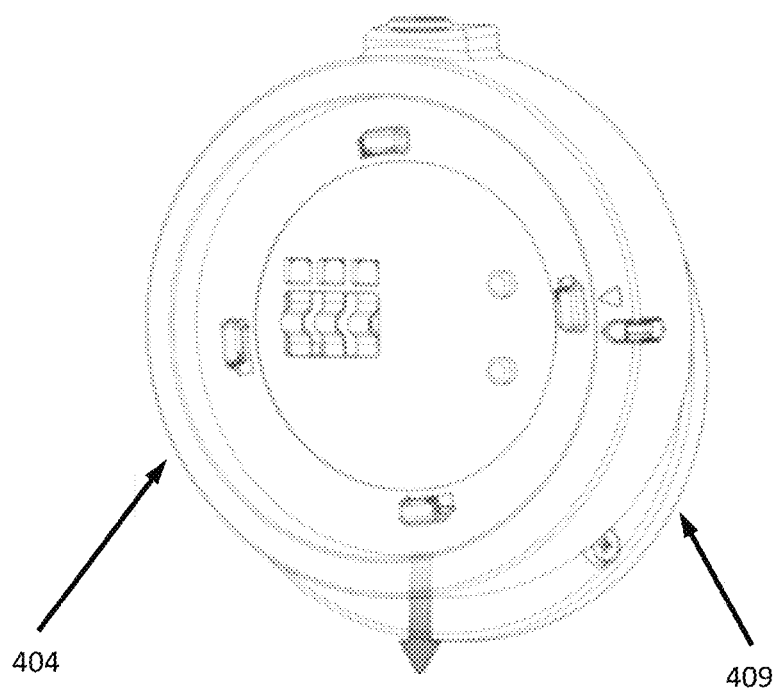
FIG. 4F is a schematic diagram depicting assembly of a base and mounting bracket of one embodiment of an external device.

In some embodiments, the external device 106*a-b* is a lamp. FIGS. 4B-D illustrate some embodiments of an external device 106*a* that functions as a lamp. In one embodiment, the external device 106*a* has a base 404. The base 404 may include a housing 405. The housing 405 may be constructed of any material or combination of materials suitable for constructing the housing 200 of the power distribution block 101*a*, as described above in reference to FIGS. 2A-2D. The housing 405 may have any shape suitable for the housing 200 of the power distribution block 101*a* as described above in reference to FIGS. 1A-3. The housing 405 may have an upper surface 406, a lower surface 407, and a lateral surface 408 connecting the upper surface 406 and the lower surface 407. The housing 405 may be attached to a wall-mounting bracket 409. The wall-mounting bracket 409 may be composed of any material or combination of materials suitable for the composition of the wall-mounting bracket 205 described above in reference to FIGS. 2A-2D. The wall-mounting bracket 409 may be attached to the housing 405 in any way described above for attaching the power distribution block 101*a* to the wall-mounting bracket 205 in reference to FIGS. 2A-2D. For instance, as shown in FIGS. 4E-4F, the base 404 may be inserted onto the wall-mounting bracket 409 by first placing the base 404 against the wall-mounting bracket 409, allowing knobs 417 with shapes analogous to round-headed or double-headed screws on the wall-mounting bracket 409 to pass through the round portions of keyhole slots (not shown) in the base 404 and then sliding the base 404 against the wall-mounting bracket 409 so that the necks of the knobs 417 pass into the narrow portions of the keyhole slots, securing the base 404 to the wall-mounting bracket 409.

In some embodiments, the power exchange port 107 is located in the base. In some embodiments, the switch 403 is located in the base. In some embodiments, the switch 403 allows the user to select one of four positions and three light levels for the lamp 106a: a first position corresponding to a maximal luminous output corresponding to 100% of the maximal luminous output for the lamp, a second position corresponding to an output of 50% of the maximal luminous output, a third position corresponding to an output of 10% of the maximal luminous output, and a fourth position opening the circuit of the load 114, corresponding to switching the lamp off; for example, the first position may correspond to a output of 450 lumens, the second position may correspond to a output of 225 lumens, and the third position may correspond to an output of 45 lumens. The three switch positions corresponding to the three lamp power levels may also correspond to three levels of power consumption; for instance, the 100% position may correspond to consumption of 4.5 W, the 50% position may correspond to consumption of 2.25 W, and the 10% position may correspond to 0.45 W.

Figure 4G:
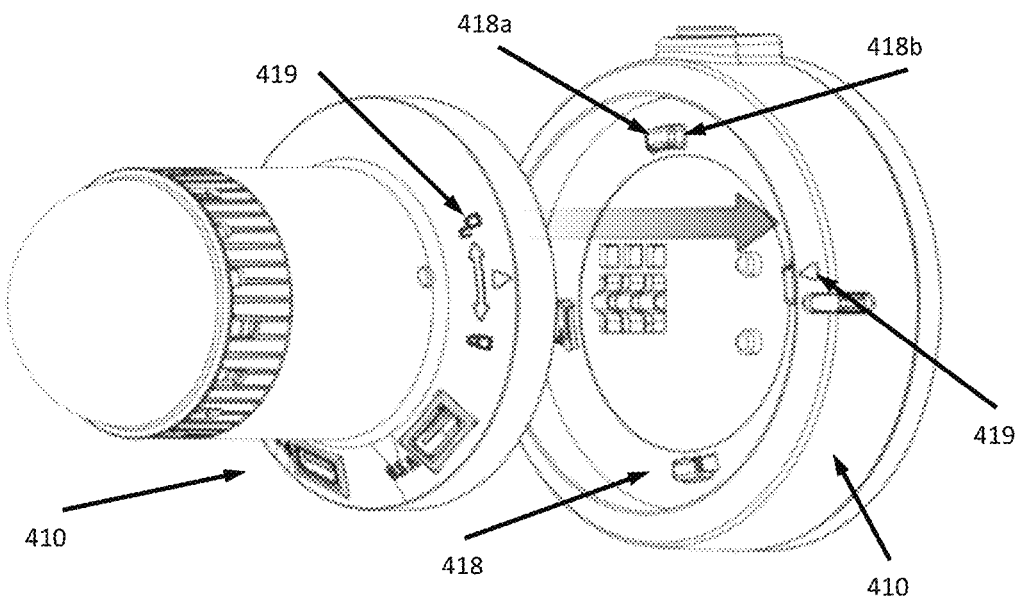
FIG. 4G is a schematic diagram depicting assembly of a base and bulb of one embodiment of an external device.
Figure 4H:
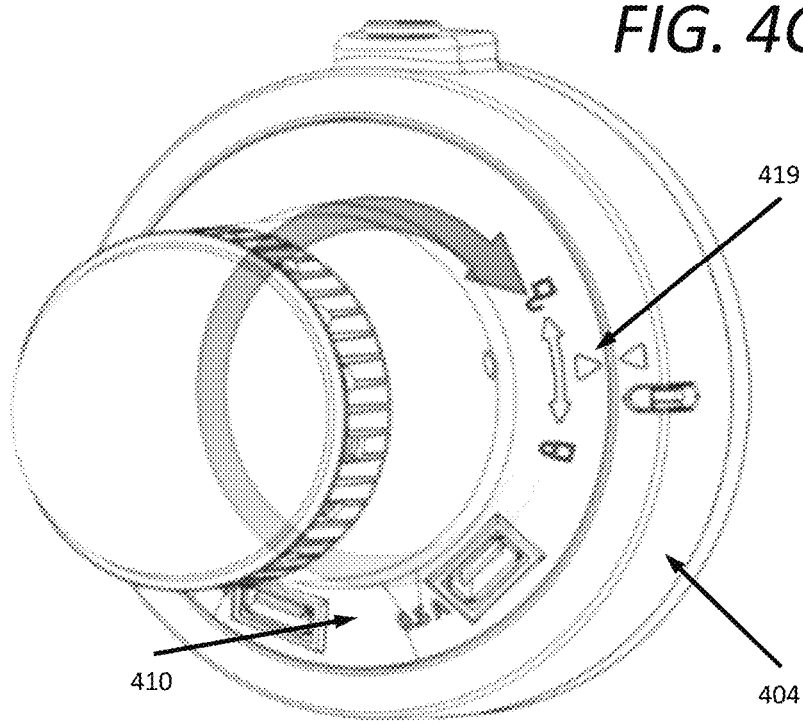
FIG. 4H is a schematic diagram depicting assembly of a base and bulb of one embodiment of an external device.

The external device 106a may include a bulb 410. The bulb may include a housing 411. The housing 411 may be composed of any material or composition of materials suitable for the construction of the housing 205 of the power distribution block 101a as described above in reference to FIGS. 2A-2D. The housing 411 may have any shape suitable for the housing 200 of the power distribution block 106a, as described above in reference to FIGS. 2A-2D. The housing 411 may be substantially cylindrical. The housing 411 may be frustoconical. The bulb 410 may be attached to the base 404. In some embodiments, the bulb 410 is detachably attached to the base 404; the attachment may be accomplished according to any method suitable for attaching the power distribution block 101a to its corresponding wall-mounting bracket 205 as disclosed above in reference to FIGS. 2A-2D. As an example, as illustrated in FIGS. 4G-4H, in some embodiments, the bulb has a plurality of tabs (not shown), each with a horizontal component and a vertical component on one side of the horizontal component, and the base has a set of tabs 418 each with a similar horizontal component 418a, and with a vertical component 418b on the opposite end of the tab, relative to the tabs on the bulb, so that the horizontal components of the bulb tabs slip beneath the horizontal components of the base tabs 418a when the bulb and base are rotated relative to each other, and the non-vertical component-bearing end of the horizontal component of at least one of the bulb tabs contacts the vertical component 418b of a corresponding base tab, stopping the rotation when the bulb and base are in the correct alignment. A catch element on the bulb (not shown) may additionally engage a catch element on the base to hold the bulb and base together when engaged. The surface of the bulb and the surface of the base may bear indicia 419 guiding the attachment of the bulb to the base in the correct alignment by a user of the network 100.

In some embodiments, the bulb contains the individual power storage device 208 of the lamp. In some embodiments, the bulb contains the control circuit 113 of the lamp 106a. The bulb may include at least one USB port 412a-b; the USB ports 412a-b may be configured to charge one or more USB-charging devices, such as mobile phones or tablets. In one embodiment, the bulb 410 includes a first USB port 412a with a 500 mA output, and a second USB port 412b with a 2A output. The USB ports 412a-b may be controlled by the controller 400 to produce outputs as required for connected devices, as described above in reference to FIGS. 1A-2D. The bulb 410 may include two or more electrical contacts on its surface 414a that connect to corresponding electrical contacts 414b on the base when the bulb and base are attached together, forming a circuit that combines the circuit elements of the base with the circuit elements of the bulb. The bulb may include a light-emitting load 114. The light-emitting load 114 may be at the distal end of the bulb, where the proximal end is the end joined to the base 404. The exterior lens 413 of the light-emitting load 114 may form a substantially hemispherical shape. The bulb 410 may include a heat sink 414 in thermal contact with the light-emitting element of the light-emitting load 114; the heat sink 414 may be constructed of any heat-conductive material, such as metal. The heat sink 414 may include one or more heat-dissipating features such as fins or ridges. The bulb 410 may include a power level indicator light 415 to signal the degree to which the individual power storage device 108 has discharged; the power level indicator light 415 may be controlled by the controller 400 as described above for the control of the power-level indicator light 208 included in the power distribution block 101a. As a non-limiting example, the power level indicator light 415 may glow green when the individual power storage device 108 is fully charged, may glow blue when the individual power storage device 108 contains power within an intermediate range of power levels, and may glow red when the individual power storage device 108 is nearly fully discharged; the intermediate level may, for instance, range from 95% charged to 21% charged, while the "fully charged" level may correspond to the individual one power storage device 108 being from 95% to 100% charged, and the nearly discharged range may cover the range from 20% to 1% charged.

Figure 6B:
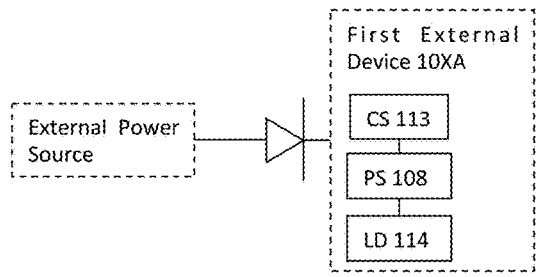
FIG. 6B is a circuit diagram depicting one embodiment of the network.

In some embodiments, as shown in FIG. 6B, the exterior device 106a may be charged directly by the exterior power source 103a; for instance, the exterior device 106a may be connected directly to the AC wall plug using an AC/DC adaptor.

Figure 7A:
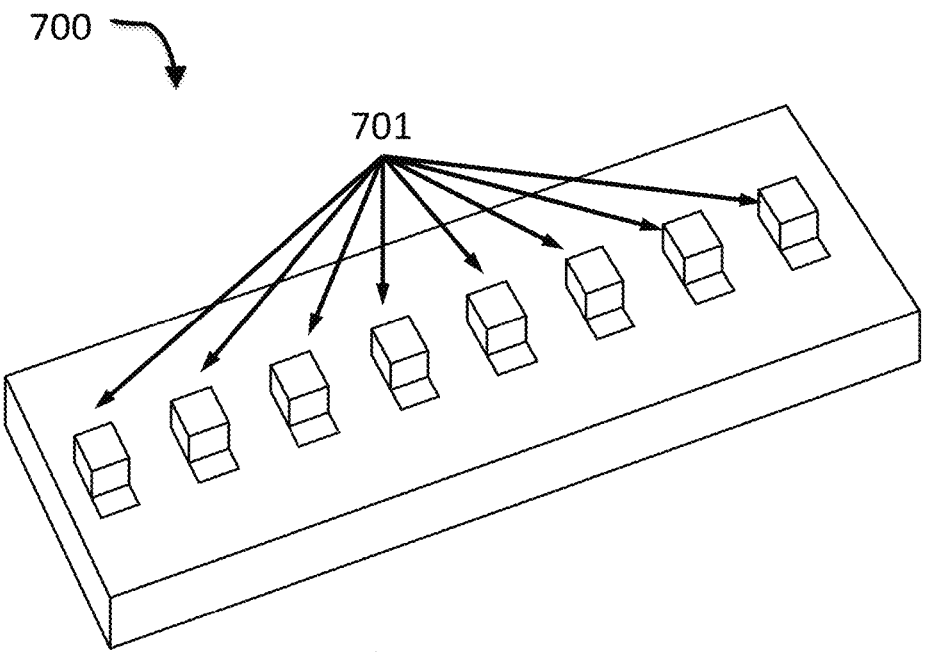
FIG. 7A is a schematic diagram illustrating one embodiment of a control panel that may be used with some embodiments of the network.
Figure 7B:
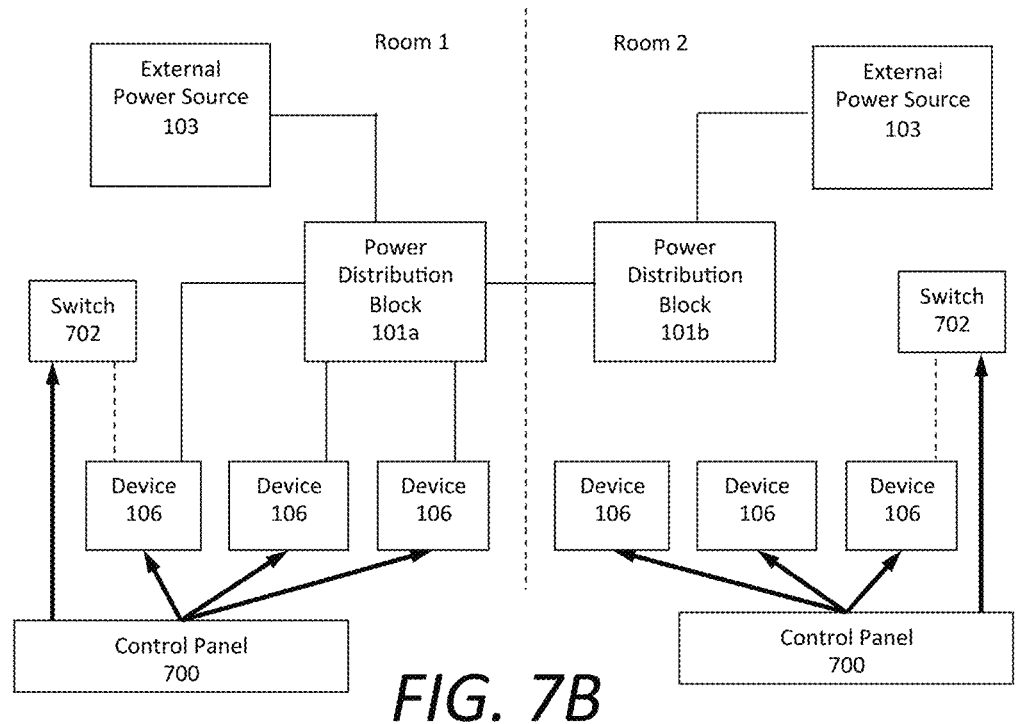
FIG. 7B is a schematic diagram depicting a possible configuration of an embodiment of the network.

As shown in FIG. 7A, the network may include at least one control panel 700. The control panel 700 may have at least one switch 701 for operating the components of the network 100, such as at least one of the power distribution blocks 101a-c, external devices 106a-c, or external power sources 103a-c. FIG. 7B depicts a possible configuration for the network 100. The control panel 700 may communicate with other components of the network wirelessly; for instance, a wireless communication component (not shown) of the control panel 700 may communicate with the wireless communication component 416 of an external device 106a, or the wireless communication component of a power distribution block 101a. In other embodiments, the control panel 700 communicates with other components of the network via wired means. For instance, the control panel 700 may connect electrically to the controller 111a of a power distribution block 101a or the controller 400 of an external device 106a. In some embodiments, the control panel 700 causes one or more components connected to the control panel 700 to switch on and off. For instance, the control panel 700 may implement the manual switch 209 of the power distribution block 101a by directing the controller 111a to place the power distribution block 101a in states corresponding to states of the manual switch; a switch 702 on the control panel 700 may have a set of states corresponding to the states of the manual switch 209. In some embodiments, the power distribution block 101a still has a manual switch 209; in other embodiments, the control panel switch 702 is implemented instead of the manual switch 209. As another example, the control panel 700 may implement the manual switch 403 of an external device 106a by directing the controller 400 to place the external device 106a in states corresponding to states of the manual switch 403;

a switch 702 on the control panel 700 may have a set of states corresponding to the states of the manual switch 403. In some embodiments, the external device 106a still has a manual switch 403; in other embodiments, the control panel switch 702 is implemented instead of the manual switch 403.

In some embodiments, the control panel 700 has a switch dedicated to the control of each component controlled by the control panel 700. In other embodiments, the control panel 700 has a switch 702 that controls a class of components; for instance, there may be one switch 702 that controls all lights in a room simultaneously. There may be a switch that controls all power distribution blocks 101a simultaneously; for example, the user may be able to enter a room and activate a single switch in the control panel 700 to turn on all lights connected to that network in that room. The user may be able to activate a single switch in the control panel 700 that turns on all of the lights in an entire dwelling. The user may be able to activate a single switch in the control panel 700 that turns on all of the lights connected to the network 100. In some embodiments, a single switch turns the entire system on; for instance, a user may be able to activate a single switch that switches on all devices in the network 100. The control panel 700 may include one or more dimmer switches; for instance, a user may be able to use a dimmer switch 702 to dim one light, all the lights in a room, all the lights in a dwelling, or all the lights connected to the network 100.

The control panel 700 may have a power supply of its own. In some embodiments, the control panel 700 has a power storage device (not shown), which may be any power storage device as described above in reference to FIGS. 1A-6B. The control panel 700 may be connected to the network 100; for instance, the control panel 700 may be an external device 106a-b where the load is the at least one switch 702 and the means used to communicate with other components controlled by the control panel 700. The control panel 700 may engage in load sharing with the rest of the network 100 as described above in reference to FIGS. 1A-6B. In some embodiments, there is a control panel 700 in each room of a dwelling, controlling one or more devices within that room.

In some embodiments, the control panel 700 is implemented as an application on a mobile device such as a smartphone. For instance, the smartphone may be configured to receive user instructions to switch on or off, or dim, components of the network 100 and to transmit those instructions to the components wirelessly; a command to change the switch state of a lamp 106a, for instance, may be transmitted to the lamp controller 400 via a wireless communication component 416 incorporated in the lamp.

As illustrated in FIGS. 1B, 3, and 6A, the network 100 may include one or more surge protection device 115. In one embodiment, each of the one or more surge protection devices 115 is a component in the network 100 that acts to prevent a surge in voltage or current from reaching portions of the network 100 connected via the surge protection device 115. The one or more surge protection devices 115 may include at least one current-limiting series resistor. The one or more surge protection devices 115 may include at least one Zener diode. The one or more surge protection devices 115 may include at least one device that diverts excess electrical power to ground; the device may include a metal oxide varistor. The device may include a transient voltage suppressant diode. The device may include a thyristor surge protection device. The device may include a gas discharge tube. The device may include a selenium voltage suppressor. The device may include a carbon block spark gap overvoltage suppressor. The network 100 may combine the one or more surge protection devices 115 with a surge response protocol coordinated by a controller 111, 113, as described above in reference to FIGS. 1A, 3, and 4A. The one or more surge protection devices 115 may be located at any point in the network 100 enabling them to protect the network element they are intended to protect. In one embodiment, surge protection devices 115 are placed between the control circuit 110a of the power distribution block 101a and the device connection ports 104a, to protect the devices connected to those ports. In other embodiments, surge protection devices 115 may be installed within the devices 106a-c themselves; for instance, a surge protection device 115 may be installed in the base 404 of a lamp. In some embodiments, there is at least one surge protector device 115 protecting each of the device connection ports 104a from surges in each of the other device protection ports 104a; for instance, there may be a surge protector device 115 between each port 104a and the next node or junction in the circuit, so that any current passing from any other part of the circuit to the port 104a must pass through the surge protector device 115. In some embodiments, an additional surge protector device 115 is placed between a device connection port 104a and an electronic device connected to that port; for instance, a cable connecting the device connection port 104a to a lead acid battery 106d may include a surge protection device (not shown) that prevents surges from reaching the lead acid battery 106d or the power distribution block 101a. The connection from a device connection port 104a to an electronic device connected to the port 104a may also include an anti-chargeback diode (not shown), which may function as described above for an anti-chargeback diode 109 in reference to FIG. 1B; for instance, the cable connecting a device connection port 104a to a lead acid battery may have an anti-chargeback diode to prevent the battery from discharging into the circuit. In some embodiments, all inputs and outputs have short circuit overload protections in place.

Figure 5A:
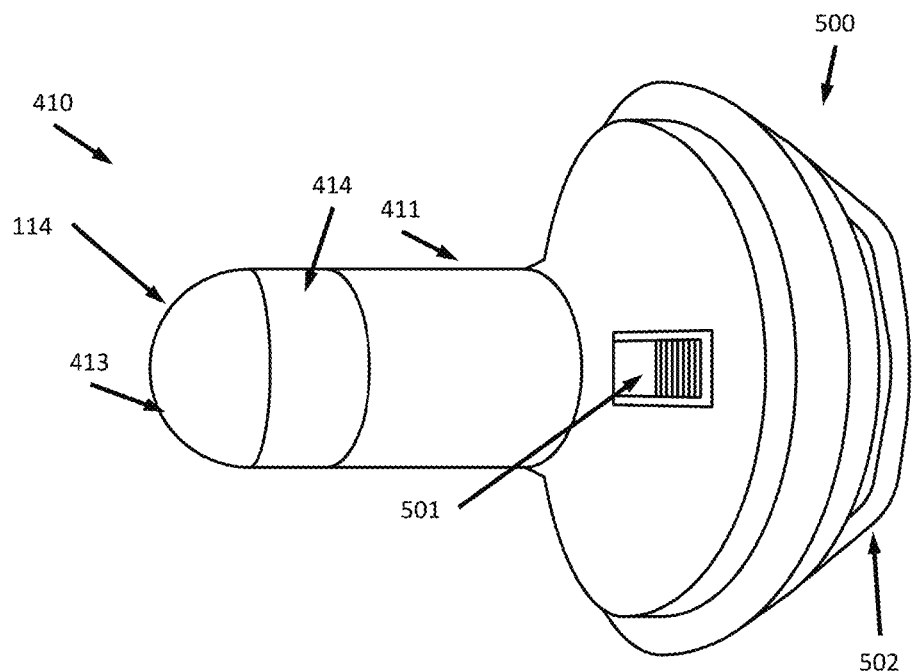
FIG. 5A is a schematic diagram depicting one embodiment of an external device.
Figure 5B:
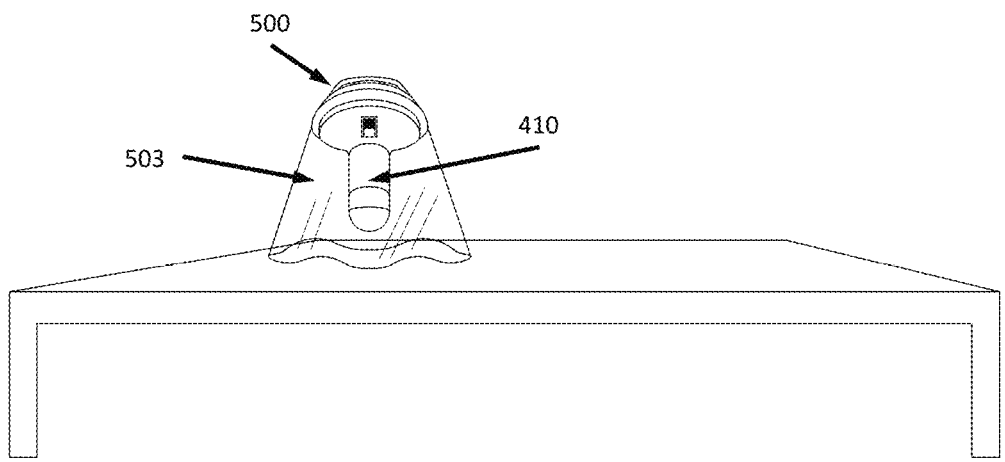
FIG. 5B is a schematic diagram depicting one embodiment of an external device.

In some embodiments, as illustrated in FIG. 5A, the network 100 includes a lantern base 500. The lantern base 500 may have a housing, which may be composed of any material or combination of materials suitable for the housing 200 of the power distribution block 101a, as disclosed above in reference to FIGS. 2A-2D. In some embodiments, the bulb 410 may be attached to the lantern base 500; the bulb 410 may be attached using any approach suitable for attaching the bulb 410 to the base 404 of the light 106a as disclosed above in reference to FIGS. 4A-4D. The lantern base may include contacts (not shown) that connect the circuit in the bulb 410 with the circuit in the lantern base 500 to for a unified circuit. The lantern base 500 may include a switch 501 that a user may activate to switch the current to the load 114 off and on. The switch 501 may be any switch as described above in reference to FIGS. 4A-4D; the switch 501 may have one or more illumination modes as described above for FIGS. 4A-4D. The lantern base 500 may include a handle 502 that a user may grip to carry the assembled lantern base 500 and bulb 410 as a portable light. In some embodiments, as illustrated in FIG. 5B, the lantern base 500 includes a stand 503. The stand 503 may be formed to support the lantern base 500 and bulb 404 together as a tabletop lamp; in some embodiments, the stand 503 is the exterior of a substantially frustoconical form, with its broad base resting on a surface, and its narrow base attached to the top surface of the lantern base 500, such that the bulb 404 is supported in an inverted position over the surface. The stand 503 may be translucent. The stand 503 may be transparent. The stand 503 may have any shape suitable for supporting the lantern base 500 and bulb 404.

Figure 7C:
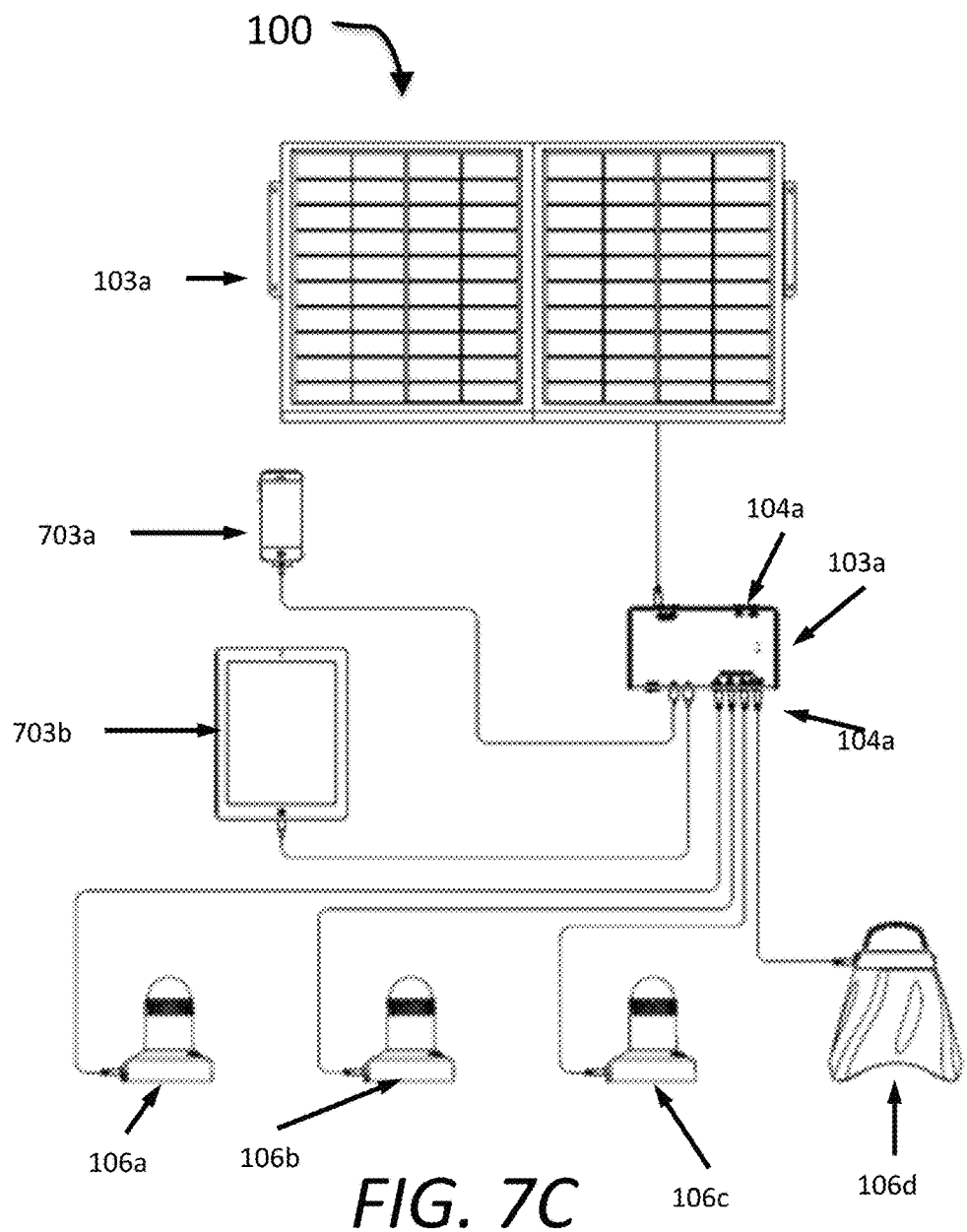
FIG. 7C is a schematic diagram depicting a possible configuration of an embodiment of the network.
Figure 7D:
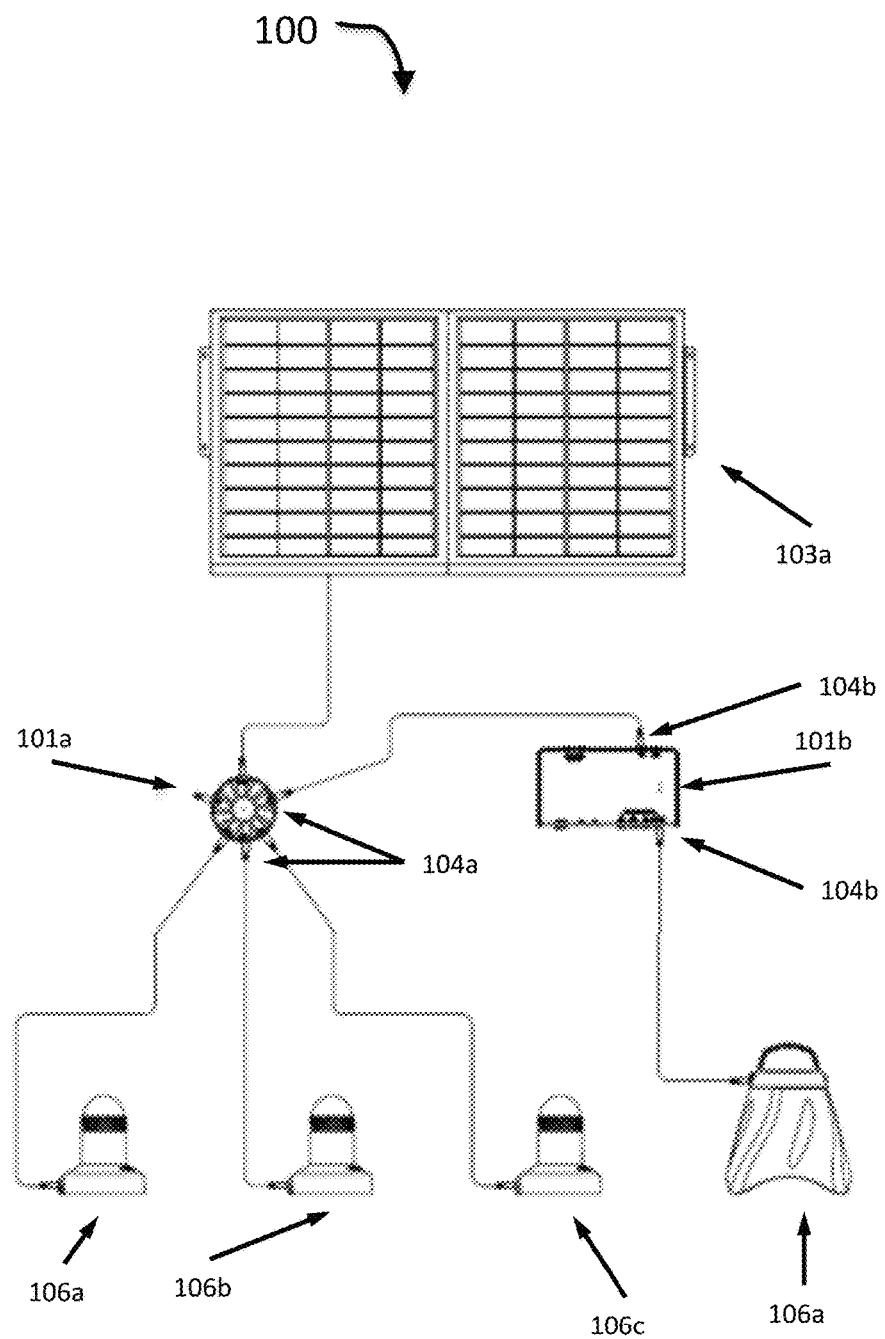
FIG. 7D is a schematic diagram depicting a possible configuration of an embodiment of the network.
Figure 7E:
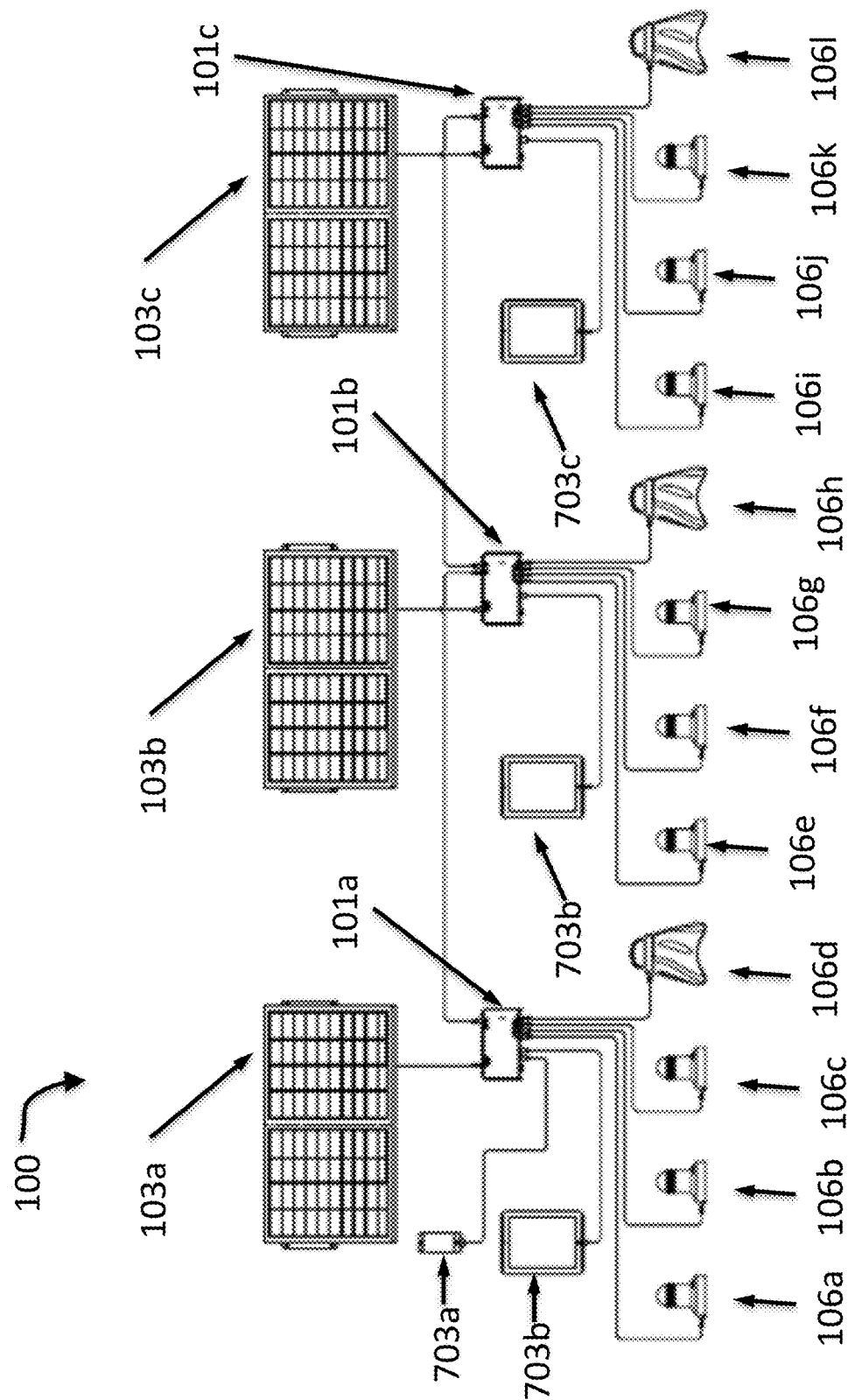
FIG. 7E is a schematic diagram depicting a possible configuration of an embodiment of the network.

The modular nature of the network 100 allows for many different configurations. For example, as illustrated in FIG. 7C, the network 100 may be deployed including a power distribution block 101a including a power storage device (not shown), using a solar panel 103a as an external power source, and connected to three lamps 106a-d, of one which 106d is a portable lantern and tabletop lamp as described above in reference to FIGS. 5A-B; devices 703a-b may be connected for charging via USB ports as described above in reference to FIGS. 2A-D. In another embodiment, as shown in FIG. 7D, a solar panel 103a is connected to a first power distribution block 101a that has no power storage device, which connects to three lamps 106a-c and a second power distribution block 101b that has a power storage device (not shown) via its device connection ports 104a; the second power distribution block 101b is connected to the first power distribution block 101a via one of its device connection ports 104b, while another of the device connection ports 104b connects to a tabletop lamp 106d. Continuing this example, each power distribution block 101a-b and each lamp 106a-d may follow load-balancing protocols as described above for FIGS. 1A-6B. A further embodiment is illustrated in FIG. 7E: three power distribution blocks having 101a-c having power storage devices (not shown) are chained together via their device connection ports, and each is powered by a solar panel 103a-c; a number of lamps 106a-1 are connected to additional device connection ports of the power distribution blocks 101a-c. In this example, all three of the power distribution blocks 101a-c and all twelve of the lamps 106a-1 may perform load-balancing protocols as described above in reference to FIGS. 1A-6B; additional mobile devices 703a-d may be charged by connection to the USB ports of the power distribution blocks 101a-c. In other embodiments, the network 100 may include one or more additional power storage devices (not shown) connected to the power distribution blocks using device connection ports; the additional power storage devices may also be power distribution blocks as described above in reference to FIGS. 1A-6B.

Figure 8:
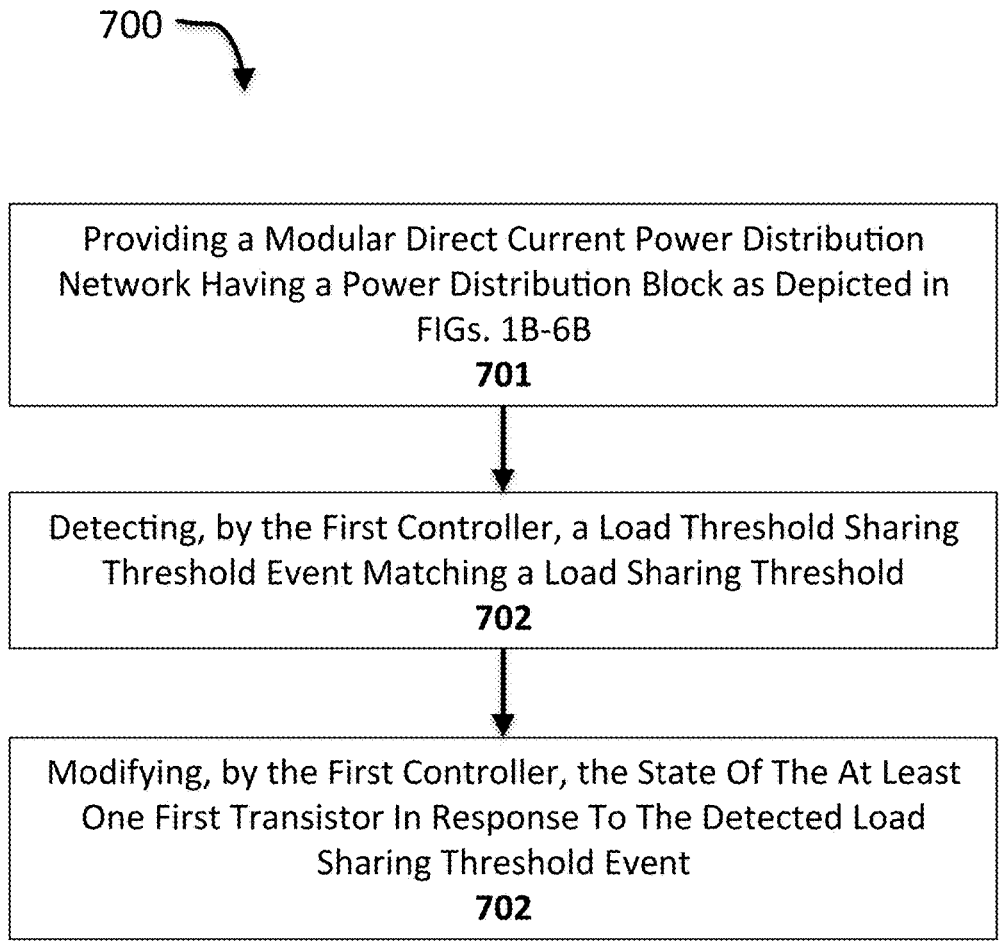
FIG. 8 is a flow diagram illustrating one embodiment of the disclosed method for load balancing.

FIG. 8 is a flow chart illustrating one embodiment of the disclosed method 800 for load balancing in a modular direct circuit network. As a brief overview, the method 800 includes providing a modular direct current power distribution network as described above in reference to FIGS. 1A-6B (801). The method 800 includes detecting, by the first controller 111, a load sharing threshold event matching a load sharing threshold (802). The method 800 includes modifying, by the first controller, the state of the at least one first transistor 112a in response to the detected load sharing threshold event (803).

In further detail, and as further illustrated by FIGS. 1A-6B, the method 800 includes providing a modular direct current power distribution network as described above in reference to FIGS. 1A-6B (801). The network 100 may be in any configuration as discussed above in reference to FIGS. 1A-6B; for instance, in some embodiments, the network 100 has a power distribution block 101a with a main power storage device 105a, while in other embodiments, the power distribution block 101a does not have a main power storage device 105a. The network 100 may include one or more external devices 106a-c. The network 100 may include one or more additional power storage devices, such as lead acid batteries 106d. The network 100 may include one or more additional power distribution blocks 101b, with or without main power storage devices.

The network 100 may be connected via one or more power distribution blocks 101a-b to external power sources 103a-b.

The method 800 includes detecting, by the first controller 111a, a load sharing threshold event matching a load sharing threshold (802). In some embodiments, the load sharing threshold event is any load sharing threshold event as described above in reference to FIGS. 1A-6B.

The method 800 includes modifying, by the first controller, the state of the at least one first transistor 112a in response to the detected load sharing threshold event (803). The controller 111a may modify the state of the at least one transistor according to any process as described above for FIGS. 1A-6B. In other embodiments, the controller 111a detects a power surge in excess of a one surge threshold, and changes the state of the at least one first transistor in response to the power surge.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A modular direct current power distribution network, the network comprising:
    a first power distribution block comprising a first housing, a first main power storage device enclosed within the housing, a first plurality of device connection ports in the housing, and at least one first transistor controlling the connection from the first main power storage device to the first plurality of device connection ports;
    at least one external device, the at least one external device having a power exchange port electrically connected to a device connection port of the first plurality of device connection ports and an individual power storage device electrically connected to the power exchange port;
    a first controller configured to sense a load sharing threshold event matching a load sharing threshold, and to modify the state of the at least one first transistor in response to the load sharing threshold condition; and wherein the load sharing threshold represents a ratio of the power stored in the first main power storage device to the power stored in the individual power storage device of the at least one first external device.

2. A network according to claim 1, wherein the first main power storage device further comprises at least one battery.

3. A network according to claim 1, wherein the at least one external device further comprises a load that consumes electrical power.

4. A network according to claim 1, wherein the at least one external device further comprises:
    a second transistor electrically connecting the power exchange port to the individual power storage device; and
    a second control circuit configured to sense a second load sharing threshold and to change the state of the second transistor in response to the second load sharing threshold.

5. A network according to claim 1, wherein the first power distribution block further comprises a manual switch having a first state and a second state, and wherein the first controller is configured to associate the first state with a first category of devices connected to the first plurality of device connection ports and to associate the second state with a second category of devices connected to the first plurality of device connection ports.

6. A network according to claim 5, wherein the first controller is further configured to use a first load sharing threshold when the manual switch is in the first state, and to use a second load sharing threshold when the manual switch is in the second state.

7. A network according to claim 5, wherein the first controller is further configured to apply a first external device charging characteristic when the manual switch is in the first state, and to apply a second charging characteristic when the manual switch is in the second state.

8. A network according to claim 1, wherein the first controller is further configured to sense a power surge in excess of a one surge threshold, and to change the state of the at least one first transistor in response to the power surge.

9. A network according to claim 8, further comprising a manual switch having at least a first state and a second state, and wherein the first controller is further configured to use a first surge threshold when the manual switch is in the first state and to use a second surge threshold when the manual switch is in the second state.

10. A network according to claim 1 further comprising an additional external power storage device electrically connected to the at least one device connection port.

11. A network according to claim 10, wherein the load sharing threshold represents a ratio between power stored in the at least one additional external power storage device and at least one of the at least one first external device and the main power storage device.

12. A network according to claim 1, wherein the power distribution block further comprises at least one first input port electrically connected to the first main power storage device, and further comprising at least one external power source electrically connected to the at least one first input port.

13. A network according to claim 12, wherein the at least one external power source further comprises a photovoltaic power source electrically connected to the at least one first input port.

14. A network according to claim 12, wherein the at least one external power source further comprises an alternating current power source electrically connected to the at least one first input port using an adapter that converts alternating current to direct current.

15. A network according to claim 12 further comprising a second transistor connecting the at least one first input port to the first main power storage device, wherein the first controller is configured to detect a surge threshold condition and to change the state of the second transistor in response to the detected surge threshold event.

16. A network according to claim 1, further comprising a second power distribution block having a second housing, and a second plurality of device connection ports in the second housing, wherein at least one of the second plurality of device connection ports is connected to at least one of the first plurality of device connection ports.

17. A network according to claim 16, wherein the second power distribution block further comprises:
  a second main power storage device enclosed within the second housing and connected to the second plurality of device connection ports;
  at least one second transistor controlling the connection between the second main power storage device and the second plurality of connection ports; and
  at least one second controller configured to sense a second load sharing threshold condition and to modify the state of the at least one second transistor in response to the second load sharing threshold condition.

18. A network according to claim 16, wherein the second power distribution block further comprises:
  at least one second transistor controlling the connection between at least two device connection ports of the second plurality of connection ports; and
  at least one second controller configured to sense a second load sharing threshold condition and to modify the state of the at least one second transistor in response to the second load sharing threshold condition.

19. A network according to claim 1, further comprising at least one surge protector between the first main power storage device and the at least one external device.

20. A method for load balancing in a modular direct circuit network, the method comprising:
  providing a modular direct current power distribution network according to claim 1;
  detecting, by the first controller, a load sharing threshold event matching a load sharing threshold; and
  modifying, by the first controller the state of the at least one first transistor in response to the detected load sharing threshold event.

* * * * *